(12) United States Patent
Garcia-Morchon et al.

(10) Patent No.: US 11,483,153 B2
(45) Date of Patent: Oct. 25, 2022

(54) KEY ENCAPSULATION PROTOCOLS

(71) Applicant: KONINKLIJKE PHILIPS N.V., Eindhoven (NL)

(72) Inventors: Oscar Garcia-Morchon, Culemborg (NL); Sauvik Bhattacharya, Ultrecht (NL); Ludovicus Marinus Gerardus Maria Tolhuizen, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 96 days.

(21) Appl. No.: 17/260,576

(22) PCT Filed: Jul. 17, 2019

(86) PCT No.: PCT/EP2019/069188
§ 371 (c)(1),
(2) Date: Jan. 15, 2021

(87) PCT Pub. No.: WO2020/016268
PCT Pub. Date: Jan. 23, 2020

(65) Prior Publication Data
US 2021/0266164 A1  Aug. 26, 2021

(30) Foreign Application Priority Data

Jul. 17, 2018 (EP) ..................... 18183911
Aug. 7, 2018 (EP) ..................... 18187763

(51) Int. Cl.
*H04L 9/30* (2006.01)
*H04L 9/08* (2006.01)

(52) U.S. Cl.
CPC .......... *H04L 9/3093* (2013.01); *H04L 9/0841* (2013.01); *H04L 2209/34* (2013.01)

(58) Field of Classification Search
CPC .. H04L 9/3093; H04L 9/0841; H04L 2209/34
(Continued)

(56) References Cited

U.S. PATENT DOCUMENTS 6,704,871 B1 * 3/2004 Kaplan ................. G06F 21/74
713/192
9,094,189 B2  7/2015 Gaborit et al.
(Continued)

FOREIGN PATENT DOCUMENTS

CA  2271178 A1 * 7/1999 ............... H04L 9/30
CN  1232588 A * 10/1999 ........... H04L 9/3093
(Continued)

OTHER PUBLICATIONS

Rhee et al., "Key recovery in IPSec for improving robustness," 2001 International Conferences on Info-Tech and Info-Net. Proceedings (Cat. No. 01EX479), 2001, pp. 72-77 vol. 5, doi: 10.1109/ICII. 2001.983497. (Year: 2001).*
(Continued)

*Primary Examiner* — Peter C Shaw

(57) ABSTRACT

Some embodiments are directed to a cryptographic device (20). A reliable bit function may be applied to a raw shared key (k*) to obtain reliable indices, indicating coefficients of a raw shared key, and reliable bits derived from the indicated coefficients. Reconciliation data (h) may be generated for the indicated coefficients of the raw shared key. A code word may be encapsulated using the reliable bits by applying an encapsulation function, obtaining encapsulated data (c) which may be transferred.

23 Claims, 12 Drawing Sheets

(58) Field of Classification Search
USPC .......................................................... 380/285
See application file for complete search history.

(56) References Cited

U.S. PATENT DOCUMENTS

| | | | |
|---|---|---|---|
| 2013/0132723 A1 | 5/2013 | Gaborit et al. | |
| 2016/0149702 A1* | 5/2016 | Fischer | H04L 9/0877 380/44 |
| 2020/0304306 A1* | 9/2020 | Cheung | H04L 9/14 |
| 2021/0203502 A1* | 7/2021 | Cheung | H04L 9/3066 |

FOREIGN PATENT DOCUMENTS

| | | | | |
|---|---|---|---|---|
| RU | 2736109 C1 * | 11/2020 | ........... | H04L 9/0819 |
| WO | 2018206344 A1 | 11/2018 | | |
| WO | WO-2021061833 A1 * | 4/2021 | | |

OTHER PUBLICATIONS

Farsana et al., "Key Encapsulation Mechanism Based on RSA Public Key Distribution Algorithm in Modified Lorenz Hyperchaotic System," 2018 International CET Conference on Control, Communication, and Computing (IC4), 2018, pp. 419-425, doi: 10.1109/CETIC4.2018.8530932. (Year: 2018).*

Kuznetsov et al., "Performance Evaluation of the Classic McEliece Key Encapsulation Algorithm," 2021 11th IEEE International Conference on Intelligent Data Acquisition and Advanced Computing Systems: Technology and Applications (IDAACS), 2021, pp. 755-760, doi: 10.1109/IDAACS53288.2021.9660833. (Year: 2021).*

International Search Report and Written Opinion From PCT/EP2019/069188 dated Sep. 23, 2019.

Saarinen Markku-Juhani et al: "HILA5: On Reliability, Reconciliation, and Error Correction for Ring-LWE Encryption",Dec. 23, 2017 (Dec. 23, 2017), International Conference on Simulation, Modeling, and Programming for Autonomous Robots,Simpar 2010; [Lecture Notes in Computer Science; Lect.Notes Computer], Springer, Berlin, Heidelberg, pp. 192-212, XP047460059, ISBN: 978-3-642-17318-9 [retrieved on Dec. 23, 2017].

Joppe Bos et al: "Frodo", Computerand Communications Security, ACM, 2 Penn Plaza, Suite 701 New York NY 10121-0701 USA, Oct. 24, 2016 (Oct. 24, 2016), pp. 1006-1018.

Lyubashevsky V., Peikert C., Regev O. (2010) On Ideal Lattices and Learning with Errors over Rings. In: Gilbert H. (eds) Advances in Cryptology—EUROCRYPT 2010. EUROCRYPT 2010. Lecture Notes in Computer Science, vol. 6110. Springer, Berlin, Heidelberg, https://doi.org/10.1007/978-3-642-13190-5_1.

Banerjee A., Peikert C., Rosen A. (2012) Pseudorandom Functions and Lattices. In: Pointcheval D., Johansson T. (eds) Advances in Cryptology—EUROCRYPT 2012. EUROCRYPT 2012. Lecture Notes in Computer Science, vol. 7237. Springer, Berlin, Heidelberg, https://doi.org/10.1007/978-3-642-29011-4_42.

Oded Regev "On Lattices, Learning With Errors, Random Linear Codes, and Cryptography" Journal of the ACM Sep. 2009.

Saarinen MJ.O. (2018) HILA5: On Reliability, Reconciliation, and Error Correction for Ring-LWE Encryption. In: Adams C., Camenisch J. (eds) Selected Areas in Cryptography—SAC 2017. SAC 2017. Lecture Notes in Computer Science, vol. 10719. Springer, Cham. https://doi.org/10.1007/978-3-319-72565-9_10.

Hayo Baan et al. "Round2: KEM and PKE based on GLWR" Published 2017 Computer Science IACR Cryptol. ePrint Arch.

* cited by examiner

KEY ENCAPSULATION PROTOCOLS

CROSS-REFERENCE TO PRIOR APPLICATIONS

This application is the U.S. National Phase application under 35 U.S.C. § 371 of International Application No. PCT/EP2019/069188, filed on Jul. 17, 2019, which claims the benefit of EP Patent Application No. EP 18187763.0, filed on Aug. 7, 2018 and EP Patent Application No. EP 18183911.9, filed on Jul. 17, 2018. These applications are hereby incorporated by reference herein.

FIELD OF THE INVENTION

The invention relates to a cryptographic device, a cryptographic method, and a computer readable medium.

BACKGROUND OF THE INVENTION

In cryptography, a key-agreement protocol is a protocol whereby two or more parties that may not yet share a common key can agree on such a key. Preferably, both parties can influence the outcome so that neither party can force the choice of key. An attacker who eavesdrops on all communication between the two parties should learn nothing about the key. Yet, while the attacker who sees the same communication learns nothing or little, the parties themselves can derive a shared key.

Key agreement protocols are useful, e.g., to secure communication, e.g., to encrypt and/or authenticate messages between the parties.

Practical key agreements protocols were introduced in 1976 when Whitfield Diffie and Martin Hellman introduced the notion of public-key cryptography. They proposed a system for key agreement between two parties which makes use of the apparent difficulty of computing logarithms over a finite field $GF(q)$ with q elements. Using the system, two users can agree on a symmetric key. The symmetric key may then be used for say, encrypted communication between the two parties.

Current key agreement methods applicable when the parties do not yet have a shared secret, such as the Diffie-Hellman key agreement method, require resource-heavy mathematical operations. For example, the Diffie-Hellman requires one to perform exponentiation operations over a finite field. Both the exponent and the field size may be large. This makes key agreement protocols less suitable for low-resource devices. On the other hand, key agreement protocols would be very useful in resource-restrained devices. For example, in application areas such as the internet of things, ad-hoc wireless networks, and the like, key agreement could be used to protect links between devices. Another example is communication between a reader and an electronic tag, say a card reader and a smart card, or a tag reader and tag, e.g., an RFID tag or an NFC tag. It would be advantageous to have a key agreement protocol that places a smaller burden on at least one of the two parties, e.g., on the electronic tag.

In order to facilitate secure communication among parties, key agreement protocols are sometimes further subdivided into cryptographic key-exchange (KEX) and cryptographic key-encapsulation (KEM) schemes. Cryptographic key-encapsulation (KEM) schemes use asymmetric cryptography to establish a shared secret among two parties, using a publicly known (e.g., public-key) and a secretly-owned (e.g., secret-key) value for each party.

KEX schemes involve the exchange of public-keys by each party, which are then independently used by the other party along with their own secret-key to calculate the common shared secret. A well-known example of a KEX scheme is the Diffie-Hellman key-exchange, mentioned above, whose security is based on solving the discrete logarithm problem. An interesting feature of some KEX schemes is that the actual final, shared secret is never exchanged between the parties, not even in encrypted form, but is calculated independently by the two parties at each end. This results in a desirable feature known as forward-secrecy, which ensures that even the compromise of a party's long-term secret-key by an attacker in the future would not compromise the secrecy of encrypted message exchanged in the past.

KEM schemes establish a shared secret between two entities or parties using asymmetric cryptography by one party, usually the initiator of the communication, to encrypt (using the other party's public-key) and transmit a shared secret to the other party, known as the responder, who can then decrypt it (using her secret-key) and then use it for securely communicating with the initiator party. KEM schemes cannot achieve forward-secrecy, since any attacker that compromises a party's secret-key for a past session and has recorded all messages exchanged between the parties in that session can recover the shared secret for that particular session.

Due to increasing security needs in the Internet of Things, key-exchange schemes need to also achieve high efficiency (e.g., minimal amount of communication or bandwidth requirements) while also remaining secure, against classical as well as quantum-capable adversaries.

Reference is made to:

RLWE: "On Ideal Lattices and Learning with Errors Over Rings", by Vadim Lyubashevsky, Chris Peikert, and Oded Regev, RLWR: "Pseudorandom Functions and Lattices", by Abhishek Banerjee, Chris Peikert, and Alon Rosen, LWE: "On Lattices, Learning with Errors, Random Linear Codes, and Cryptography", by Oded Regev.

LWR: "Pseudorandom Functions and Lattices", by Abhishek Banerjee, Chris Peikert, and Alon Rosen, Hila5: "HILA5: On Reliability, Reconciliation, and Error Correction for Ring-LWE Encryption", by Markku-Juhani O. Saarinen Round2: "Round2: KEM and PKE based on GLWR", by Hayo Baan, Sauvik Bhattacharya, Oscar Garcia-Morchon, Ronald Rietman, Ludo Tolhuizen, Jose-Luis Torre-Arce, and Zhenfei Zhang These references are included herein by reference.

SUMMARY OF THE INVENTION

It would be advantageous to have improved cryptographic devices addressing these and other concerns. A first and second cryptographic device are presented.

A second cryptographic device may comprise a communication interface configured to communicate with a first cryptographic device. The second cryptographic device may comprise a processor. The processor may be configured to do one or more of the following:

obtain a first public key for the first cryptographic device, generate a second private key, a code word according to an error correcting code, and generate a second public key from the second private key, generate a second raw shared key from the first public key and the second private key, apply a reliable bit function to the second raw shared key obtaining reliable indices, indicating coefficients of the raw shared key, and reliable bits derived from the indicated coefficients, generate reconciliation data for the indicated coefficients of the raw shared key, the reconciliation data comprising information allowing reducing of differences between the first and second raw key derived at the first and second device, encapsulate the code word with the reliable bits by applying an encapsulation function, obtaining encapsulated data, and transfer the second public key, the reconciliation data, the encapsulated data, and the reliable indices to the first device.

The first cryptographic device may comprise a communication interface configured to communicate with a second cryptographic device. The first cryptographic device may comprise a processor. The processor may be configured to do one or more of the following:

obtain a first private key and a first public key derived from the first private key, transfer the first public key to the second device, receive from the second device a second public key, reconciliation data, and encapsulated data, and reliable indices, generate a first raw shared key from the second public key and the first private key, apply the reconciliation data in a reconciliation function to the coefficients in the first raw shared key indicated by the reliable indices, obtaining reliable bits decapsulate the encapsulated data obtaining a near-code word using the reliable bits, apply an error correction function to the near-code word obtaining a code word.

Interestingly, encapsulation applies both to data bits and parity bits, not just parity bits. Moreover, the encapsulation is applied to a code word, which may be partly generated data e.g., a message, a key, and/or a pre-key. Encapsulation is not applied to data which is derived from the private keys, or even from the public keys. This improves resilience against active attacks. Note that the code word is independent from the private keys, and even from the public keys.

In an embodiment, a shared key is derived from at least a data part of the code word. Note that in an embodiment, none of the reliable bits are used to derive a key from, but instead they are used for encapsulation, may be ignored, or are used for other purposes, e.g., derive an unrelated key form.

In an embodiment, the first and second cryptographic devices are configured for a key agreement protocol. For example, a shared cryptographic key may be derived from at least the data encoded in the code word. In this case the first private key may be generated ephemerally for generating the shared key. The second private key may also be generated ephemerally.

In an embodiment, the first and second cryptographic devices are configured for public key encryption. For example, a message may be encoded in the code word. The message can be obtained by the first cryptographic device. For example, the message may be encrypted with a shared symmetric key derived from at least the data encoded in the code word. The encrypted message may be sent with the second public key from the second device to first device. Multiple second cryptographic devices can use the same public information, e.g., the first public key, to encrypt messages for the first cryptographic device.

Interestingly, the three sources of information may be used to reduce failure probability when exchanging the code word, and a randomly generated key from it. Moreover, because the code word can be generated randomly, active security is obtained. These sources include the use of reliable bits, the reconciliation data extracted for coefficients of a raw key, and error correcting redundancy information which is part of the code word, e.g., parity bits.

For example, in an embodiment the first and second cryptographic device may agree on a raw key, say a polynomial key k* with n coefficients in $Z\_q$. For example, n may be the size of the polynomial ring. For example, a coefficient in a raw key may be mapped to part of a final key, or a pre-key, e.g., to one or more bits. For example, half of the values in $Z\_q$ may be mapped to 0 and half of them to 1. Selecting reliable bits may be done by selecting, e.g., some number, say mu, of coefficients that are furthest away from the decoding boundary so that the likelihood of making an error is lower.

Key reconciliation data may be information which is extracted by the second cryptographic device, e.g., for the chosen, reliable coefficients, say the chosen mu coefficients, of the raw key, say the polynomial key. The reconciliation information helps the first cryptographic device to come to the same decision, whether a specific coefficient of the raw key is mapped to what part of the code word. Not that this need only to be done for the selected reliable coefficients, which means that less work is needed.

Error correction information may be parity bits. Parity bits may be extracted from the randomly generated binary key K, message m or pre-key so that the information that the second device encapsulates has some redundancy. In this way, even if errors are made before, the first device can correct them. So if you want to transmit a key K that is kappa bits long and there are (mu-kappa) parity bits, these parity bits help the first device to make sure that the kappa bits of the key K are correct.

The first and second cryptographic devices may be electronic devices. For example, they may be a computer. They may be mobile electronic devices, e.g., a mobile phone, a smart card. The first and second cryptographic devices may be consumer electronics, e.g., a set-top box, a television.

Devices and methods according to an embodiment may be applied in a wide range of practical applications. Such practical applications include a number of cryptographic protocols. Such practical applications include a messaging applications, sensor networks, data communication, financial applications, etc.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of a KEX protocol, FIG. 2 schematically shows an example of a KEM protocol, FIG. 3 schematically shows an example of a KEM protocol, FIG. 4 schematically shows an example of a KEM protocol, FIG. 5a schematically shows an example of an embodiment of a public key encryption (PKE) protocol, FIG. 5b schematically shows an example of an embodiment of a KEM protocol, FIG. 6 schematically shows how embodiments may be based upon each other, FIG. 7a schematically shows an example of an embodiment of a first party device 100, FIG. 7b schematically shows an example of an embodiment of a second party device 200, FIG. 7c schematically shows an example of an embodiment of a cryptographic system 101, FIG. 8a schematically shows a computer readable medium having a writable part comprising a computer program according to an embodiment, FIG. 8b schematically shows a representation of a processor system according to an embodiment.

Figure 1:
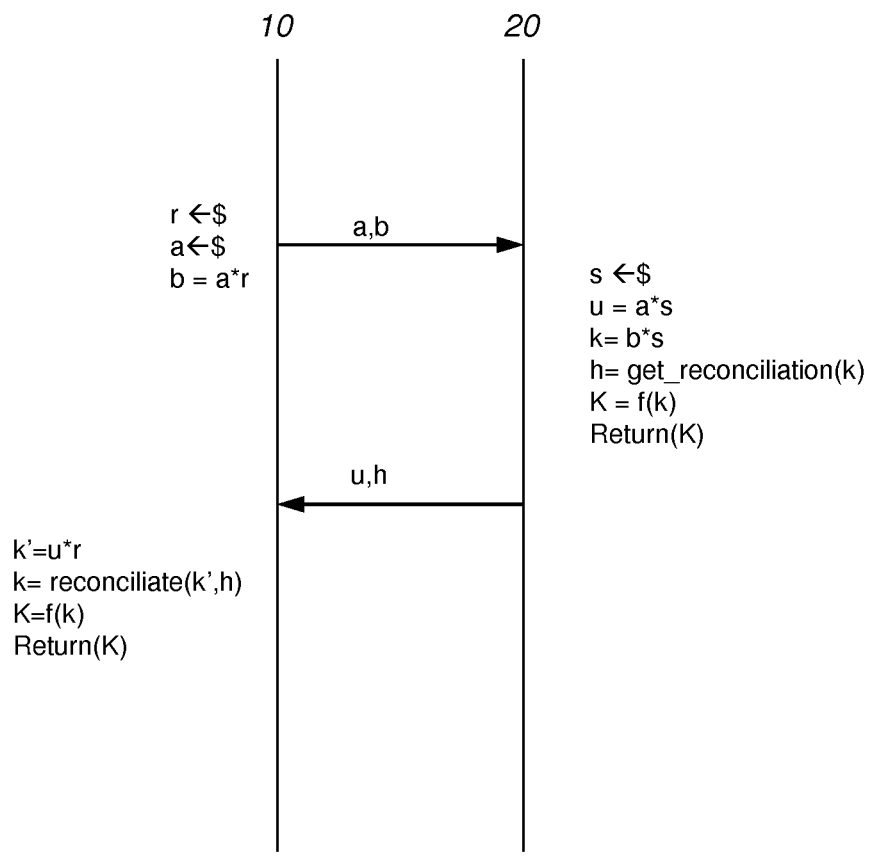

LIST OF REFERENCE NUMERALS 10 a first party
20 a second party
100 a first party device
130 a communication interface
191 a computer network
192 a storage interface
194 a processor
196 a memory
200 a second party device
230 a communication interface
292 a storage interface
294 a processor
296 a memory
300 a first cryptographic device
301 a cryptographic system
302 a public key depository
305 a communication interface
315 a public/private key generator
320 an error corrector
325 a Diffie-Hellman unit
335 a reconciliation unit
340 a decapsulation unit
350 a second cryptographic device
355 a communication interface
360 a public key obtainer
365 a public/private key generator
370 a code word generator
375 a Diffie-Hellman unit
380 a reliable bit generator
385 a reconciliation data generator
390 an encapsulator
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

We present a KEM protocol that uses a KEX key k to encapsulate a random key K determined by the second party as well as parity_bits on K. Embodiments use a KEX for encapsulation, and a reliable bit function to reduce failure probability. Since it uses a KEX key for encapsulation, helper data can be exchanged that requires low bandwidth requirements and reduces failure probability. Since it encapsulates, active security can be achieved. Since it also encapsulates parity bits, then again better failure probability can be achieved. In embodiments below, we will refer to the function safe_bits, but this may be any reliable bit function.

A problem of many quantum resistant key exchange protocols is that they have some failure probability. For example, a first party and a second party initially agree on a noisy raw key, which is then reconciled, e.g., through reconciliation data. A reliable bit function allows the second party, e.g., the party that first derives the raw key, to identify which bits in the raw key are more likely to be derived in the same way by the first party, and which bits in the raw key are less likely to be the same.

A straightforward implementation of a reliable bit function defines two or more center point for the coefficients that are sampled to obtain key bits. Coefficients that are too far away from the center points, e.g., according to a threshold, may be discarded whereas the remainder may be sampled to a value associated with the center point. For example, the number of center points may be a power of 2. For example, the coefficients may be polynomial coefficients, or matrix elements, possibly over a variety of different rings and the like.

Reliable bit sampling uses the assumption that not all bits given by a ring dimension are needed for the keys. Typically, the dimension of the underlying polynomials/matrices y is much larger than the required key length. For example, the second party may select m indexes in y that are most likely to agree. These safe coefficients may be those that are closest to center points of the coefficients ranges that are mapped to a zero bit or to a one bit; k=0 and k=1. For example, in a ring modulo q a coefficient d may be mapped to 0 if d is in the range $$[\lfloor \tfrac{q}{4} \rfloor - b, \lceil \tfrac{q}{4} \rceil + b]$$

and to 1 if d is in the range d is in the range $$[\lfloor \tfrac{3q}{4} \rfloor - b, \lceil \tfrac{3q}{4} \rceil + b],$$

or vice versa. If d is in neither range it is not a reliable bit. The value b determines, in part, the reliability of the bits. For example, in this case it may be chosen as q/8; smaller values for b provide more reliability but less key bits. In this case the center points may be q/4 and 3q/4, or a rounding thereof.

The second party who applies the above procedure, obtains indices of reliable bits and key bits that correspond to them. The reliable indices may be communicated to the first party, the reliable key bits are not. The first party can obtain key bits from the bit at the indices indicated by the second party. As these bits are more reliable, the error rate will be lower.

Further implementations of a reliable bit functions can be found in the paper Hila 5, included herein by reference. For example, the algorithms in section 3 may be applied. The inventors found that reliable bit functions may be applied in a range of situations, e.g., with different underlying rings or objects, e.g., polynomials or matrices.

There are a number of different key exchange and key encapsulation mechanisms, which are illustrated with reference to the figures.

FIG. 1 schematically shows an example of a KEX protocol. An example of this protocol is spKEX or Frodo.

Figure 2:
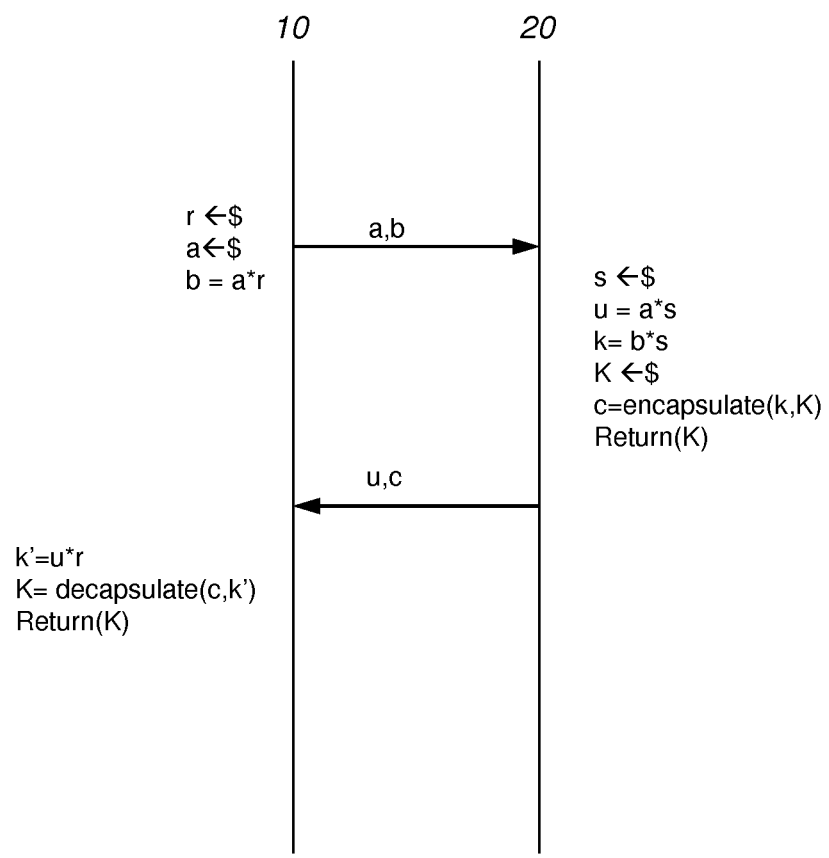

FIG. 2 schematically shows an example of a KEM protocol. An example of this protocol is the CPA-PKE version of Round2 or NewHope Simple.

Figure 3:
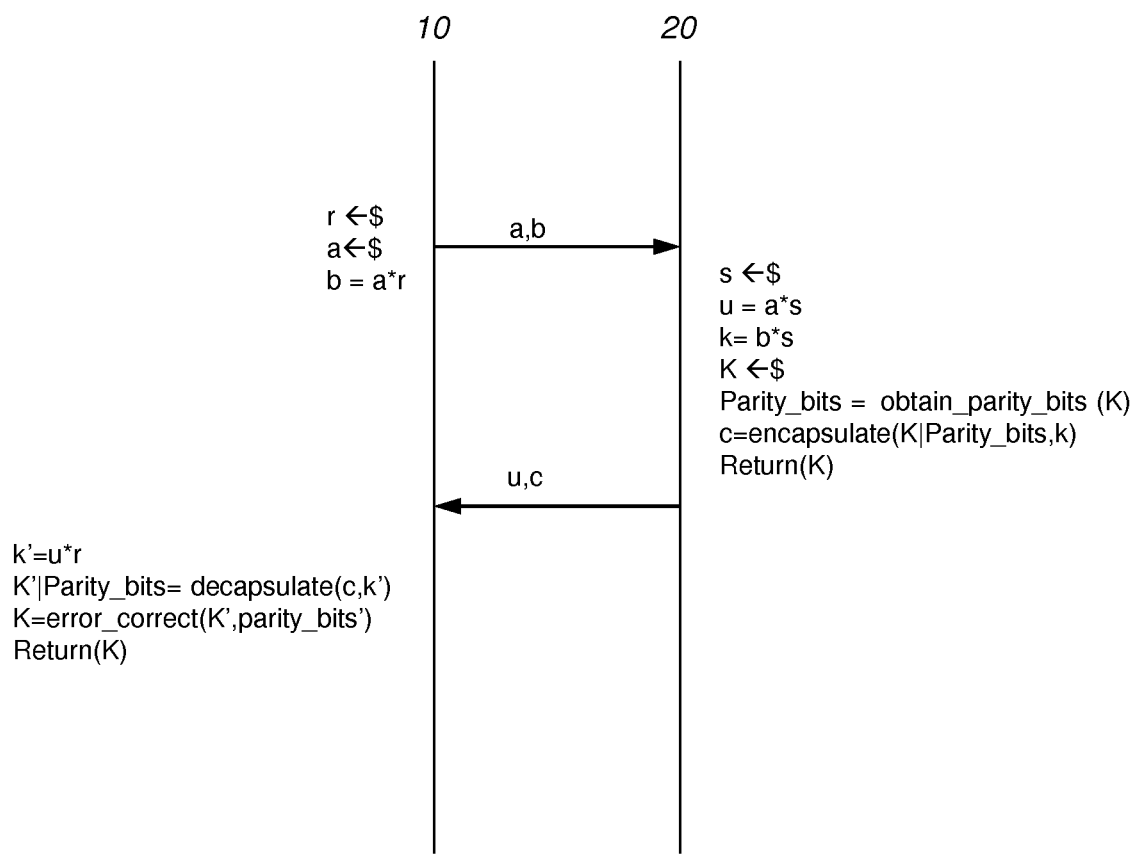

FIG. 3 schematically shows an example of a KEM protocol with error correction.

Figure 4:
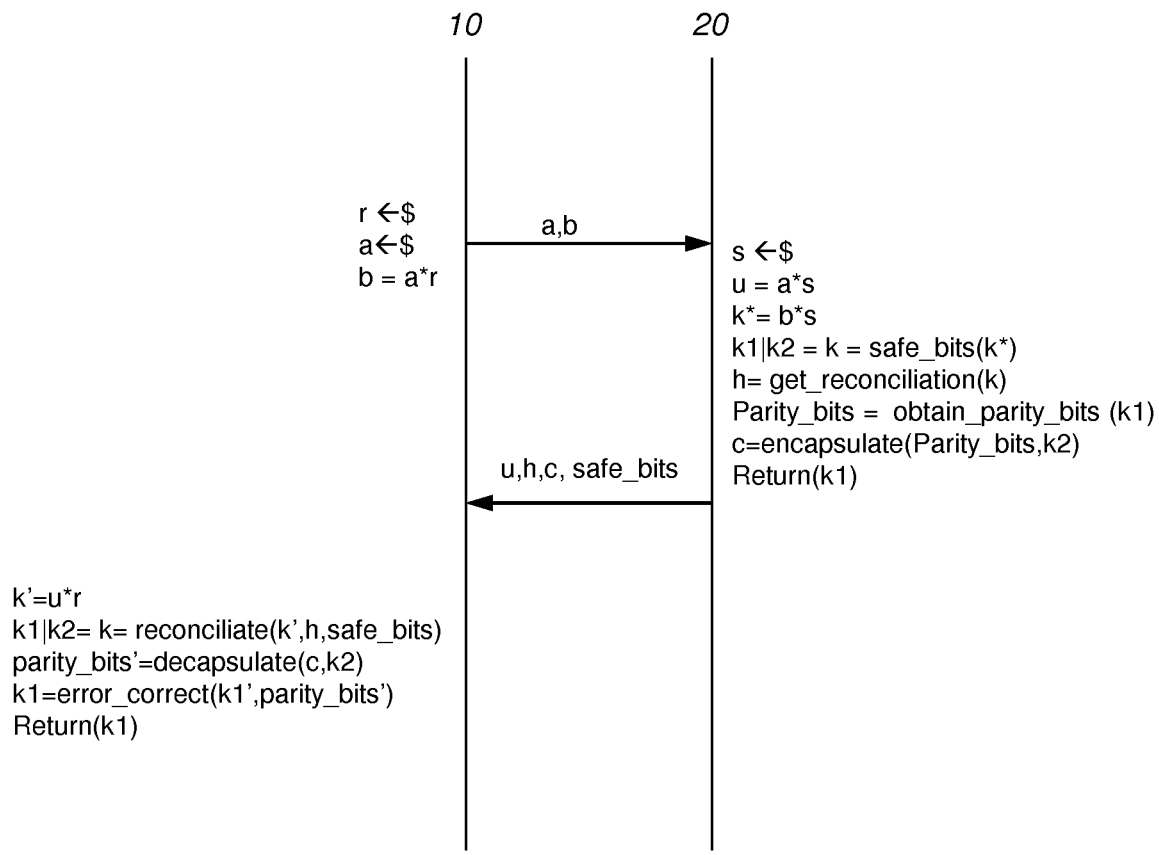

FIG. 4 schematically shows an example of a KEX that uses the KEX key for key encapsulation and incorporates error correction. An example of this protocol is HILA5.

The notation in the figures is as follows:

a represents a master secret, e.g., a polynomial in a given ring (e.g., as in RLWE or RLWR) or a matrix with elements in the integers (e.g., as in LWE or LWR).

r and s represent the secrets of the first party and the second party.

b and u represent the "public" key shares of the first party and the second party illustrated as the product of a*r or a*s. This operation representation actually means the one-way function of the underlying problem. The start (*) operation derives a new mathematical object from two underlying objects, while introducing some noise. For example, the star operation may be polynomial or matrix multiplication; for example, noise may be introduced explicitly by adding noise elements, or implicitly, e.g., by rounding. Examples of start operations can be found in that can be (R)LWE or (R)LWR or a module version of them. For instance, a*r may mean Round((A*r (mod q)), p, q), e.g., as in LWR. This means the product of r being a vector of length n times an n×n square matrix A modulo q. Then the result is rounded with integers p and q where p<q by performing p/q (A*r (mod q).

c represents the ciphertext h represents the helper data including reconciliation bits parity_bits refers to the information used for error correction get_reconciliation(k) is a function that returns reconciliation bits out of raw_key k.

reconciliate(k,h) is a function that reconciliates raw_key k given reconciliation bits h.

encapsulate(m,k) means that the message m is encapsulated with k. For example, if k lives in Z_q, then m may be represented in Z_q too. If k lives in Z_2, then this is equivalent to an XOR. Encapsulation may be then done—component-wise—as:

$$c = k + m*(q/2)(\text{mod } q).$$

For example, an encapsulation function may mask a message m using a key k such that an error in k has a limited effect on m, e.g., a linear effect.

decapsulate(c,k) means that the ciphertext c is decapsulated from k returning a bit string.

obtain_parity_bits(k) means that some parity bits of k are obtained. For example, parity bits may be generated according to an error correcting code.

error_correct(k, parity_bits) means that the parity_bits are used to correct potential errors in either k or parity_bits obtaining a version of k that is more likely to be error free safe_bits( ) returns two values: (i) the actual reliable values and (ii) the positions of the key bits that can lead to lower failure probability since the obtained values are further away of the quantification boundaries. The actual values returned by Safe_bits( ) are later used, e.g., for encapsulation. The positions are exchanged to the other party so that it knows which positions are needed.

The KEX in FIG. 1 allows the first party and the second party to agree on a key. This key has low failure probability since the first party and the second party exchange some reconciliation_bits. A problem of a KEX (FIG. 1) is that it only allows for a single step of error reduction, namely the usage of key reconciliation. Another problem in the KEX is that the keys are only determined by r and s. As a result, the KEX cannot achieve active security for messages to be protected.

The KEM in FIG. 2 allows the second party to encapsulate a random key of his choice given the public key b of the first party. This allows achieving active security. A problem of a KEM (FIG. 2) is that it only has a single step to reduce errors, usually by varying the compression ratio in the ciphertext c. It is desirable to compress in such a way that the bandwidth requirements are lower, e.g., if the elements to be encapsulated are in Z_q, then the elements can be moved to Z_t (where t>q). However, if t is very small, then the failure probability increases.

The KEM in FIG. 3 allows the second party to include parity_bits on the key that he wants to encapsulate. Thus, the first party can correct errors that might occur. This reduces failure probability. The difference of a KEM with error correction (FIG. 3) is that compared with a KEX the encapsulated keys are in Z_q or Z_t so that the KEM is effectively encapsulating the actual key determined by the second party. However, this also means that a KEM will always have more overhead than a KEX.

The protocol in FIG. 4 is a KEX that uses the KEX key together with error correction. A nice property of this construction is that it allows adding an error correction code that as in the protocol in FIG. 3 reduces failure probability. Since it is a KEX, it can also use the function safe_bits( ) that returns the bits of the shared key k* that lead to lower failure probability. A problem of the protocol in FIG. 4 is that it does not allow for active security. The reason is that the returned key is only determined by r and s.

FIG. 4 schematically shows an example of an embodiment of a KEM protocol, the encapsulate function may be, for example, c=encapsulate ( )=(k1|parity_bits(k1)) XOR (k2). An example of parameters for use in the protocol of FIG. 4, using the above encapsulation function:

k1 is kappa bits long, e.g., 256 bits
Parity bits are, e.g., 121 bits
k2 is mu bits long, e.g., 121
C is parity_bits bits long, e.g., 121
H is (kappa+parity_bits)b_h bits long, e.g., 256+121

Figure 5A:
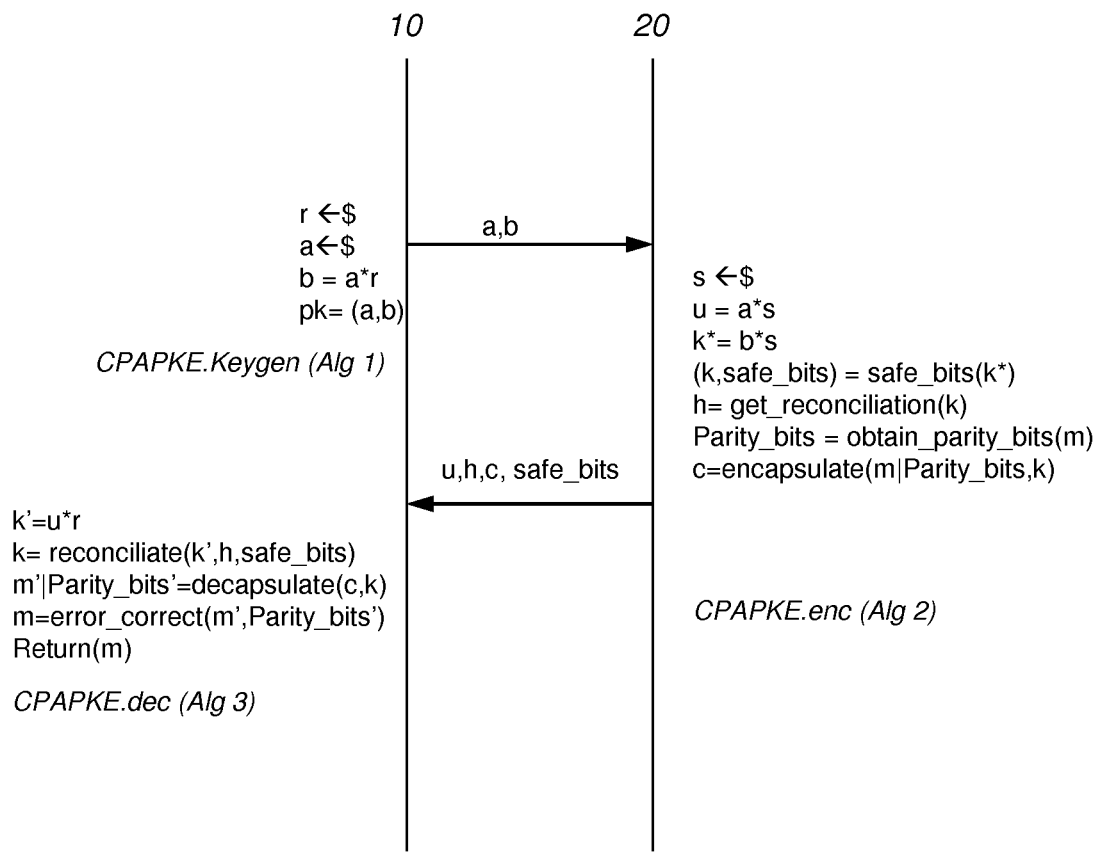

FIG. 5a schematically shows an example of an embodiment of a PKE protocol. The PKE protocol of FIG. 5 uses key reconciliation, error correction and safe_bits.

FIG. 5a refers to algorithms in Annex A for particular examples of embodiments. Note however that Algorithms 1, 2, and 3 describe a specific embodiment, which may be implemented in part, e.g., using primitives similar to those in RLWR. However, the protocol illustrated in FIG. 5a is more generic since the operations a*s, a*r, b*s, u*r represent many different underlying cryptographic problems such as LWR, MLWR, RLWR, LWE, MLWE or RLWE.

The encapsulate function may be, for example, c=encapsulate ( )=(K|parity_bits(K)) XOR (k*). With this choice, we may use the following example parameters:

K is kappa bits long, e.g., 256 bits
Parity bits are, e.g., 121 bits
K* is mu=kappa+parity_bits bits long, e.g., 256+121
c is mu bits long, e.g., 256+121
H is (kappa+parity_bits)b_h bits long, e.g., 256+121
Safe_bits: n bits In the public key encryption protocol of FIG. 5a, the first party 10 may generate random object a and r, e.g., a polynomial or matrix. The corresponding public key comprises their star-product b. The object a may be shared between the parties by other means, but in an embodiment both a and b are part of the public key. To encrypt a message m for the public key, the second party 20 may generate an ephemeral private key s, and determine therefrom the corresponding public key comprising u. In a PKE the first party 10 may reuse its public key, e.g., a and b. Many parties 20 may use the same a and b to encrypt messages for first party 10. Note that transferring a shared object a may be done by transferring a seed from which a may be generated, e.g., pseudo-randomly.

Figure 5B:
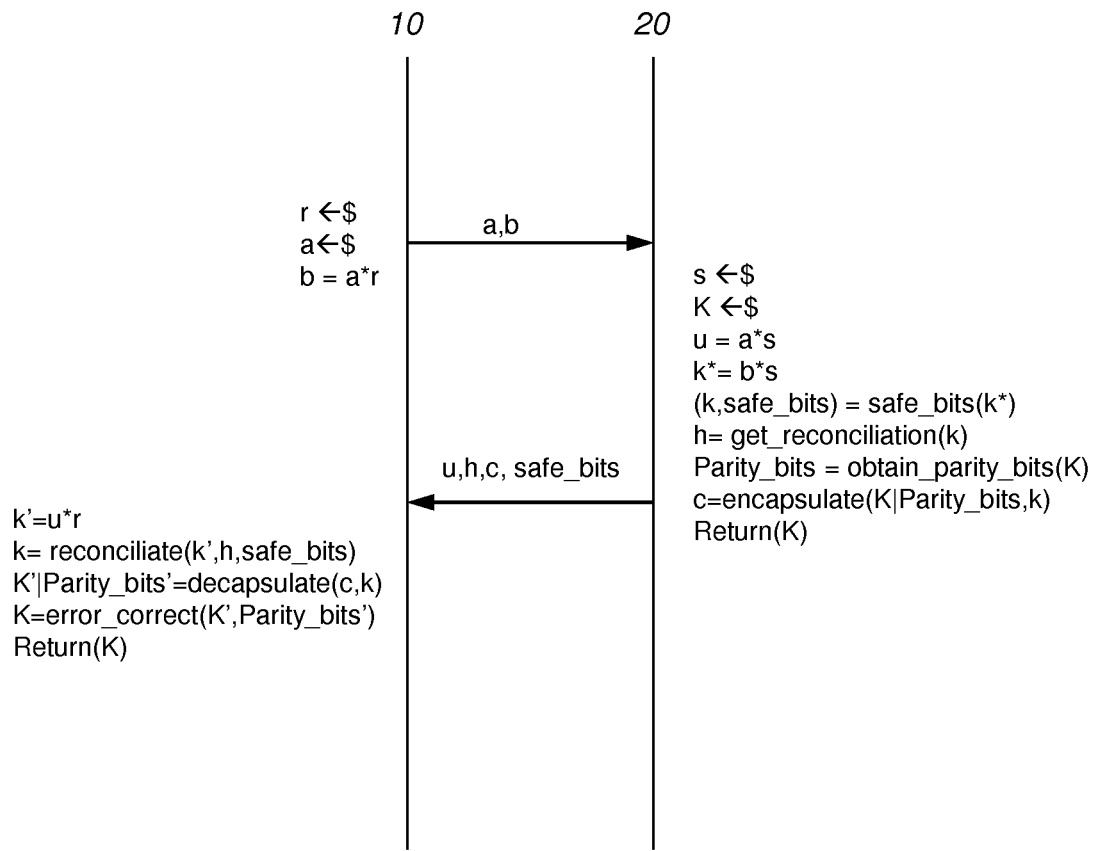

To use a similar protocol as a KEM, the public keys may be generated randomly at both sides. Such a protocol is illustrated in FIG. 5b.

We present a KEM protocol that uses a KEX key k to encapsulate a random key K determined by the second party as well as parity_bits on K. Since the key used for encapsulation is coming from a KEX, safe_bits( ) can be applied reducing failure probability. Since this key used for encapsulation comes from a KEX, helper data can be exchanged that requires low bandwidth requirements and reduces failure probability. Since the overall protocol encapsulates, active security can be achieved. Since it also encapsulates parity bits, better failure probability can be achieved.

This scheme has the following properties:
As in the protocols of FIG. 1 or FIG. 4, it is a KEX so that a large overhead from the encapsulation of a key in Z_t is not required.
As in the protocols of FIG. 1 or FIG. 4, it is a KEX so that reconciliation_bits are appended to perform key reconciliation and reduce failure probability.
As in the protocols of FIG. 3 or FIG. 4, it allows for the incorporation of parity_bits so that failure probability is further reduced.
Encapsulation is in Z_2 so that overhead for encapsulation is minimized.

For example, the following advantages are obtained compared with:
The protocol in FIG. 1 is that the new protocol allows for active security and incorporates error correction to reduce failure probability/bandwidth needs.
The protocol in FIG. 2 is that the new protocol allows for selection of safe_bits and error_correction
The protocol in FIG. 3 is that the new protocol allows for selection of safe_bits
The protocol in FIG. 4 is that the new protocol allows for active security.

The inventors found this approach to be more efficient than the protocol in FIG. 3.

The protocol of FIG. 5a may be applied to messages m, but also to a key K. For example, the key may be generated at the second party. An example of such an application is shown in FIG. 5b. An embodiment, e.g., as in FIG. 5b below, may comprise the following parts:

1: the first party obtains secret key r, public parameter a, and its public key share b.
2: the first party sends a and b. the first party can also send a seed to obtain a instead.
3: the second party obtains its secret key s, the second party randomly obtains the key K that the second party wishes to encapsulate too. Then the second party obtains his public key-share u and the master key k*. the second party runs the function safe_bits on k* to obtain the bits in k* that are most suitable, in other words, that will likely lead to less failures since their values are further from the decision boundaries. Next, it applies the function get_reconciliation( ) to obtain the key reconciliation material for the selected safe_bits. Next, the second party obtains parity bits for the generated key K. The parity bits are obtained using the error correction method of his choice. Then the second party proceeds to encapsulate the binary bit string comprising, e.g., consisting, of the key K and the parity bits with the key k coming out of the key exchange.

Here encapsulation means bit-wise xoring since the elements of the key are in Z_2. This is ciphertext c.

4: is to send to the first party the public key share u, the helper data h, and ciphertext c. the second party should also include the safe_bits 5: the first party proceeds to obtain K by first obtaining its raw key k'. Then she reconciles the key given the raw key, helper data and location of the safe_bits. With this information, the first party can now decapsulate and obtain an estimation of (K|Parity_bits(K)) to which she applies the error_correct( ) function to remove potential errors. The first party obtains K.

Figure 6:
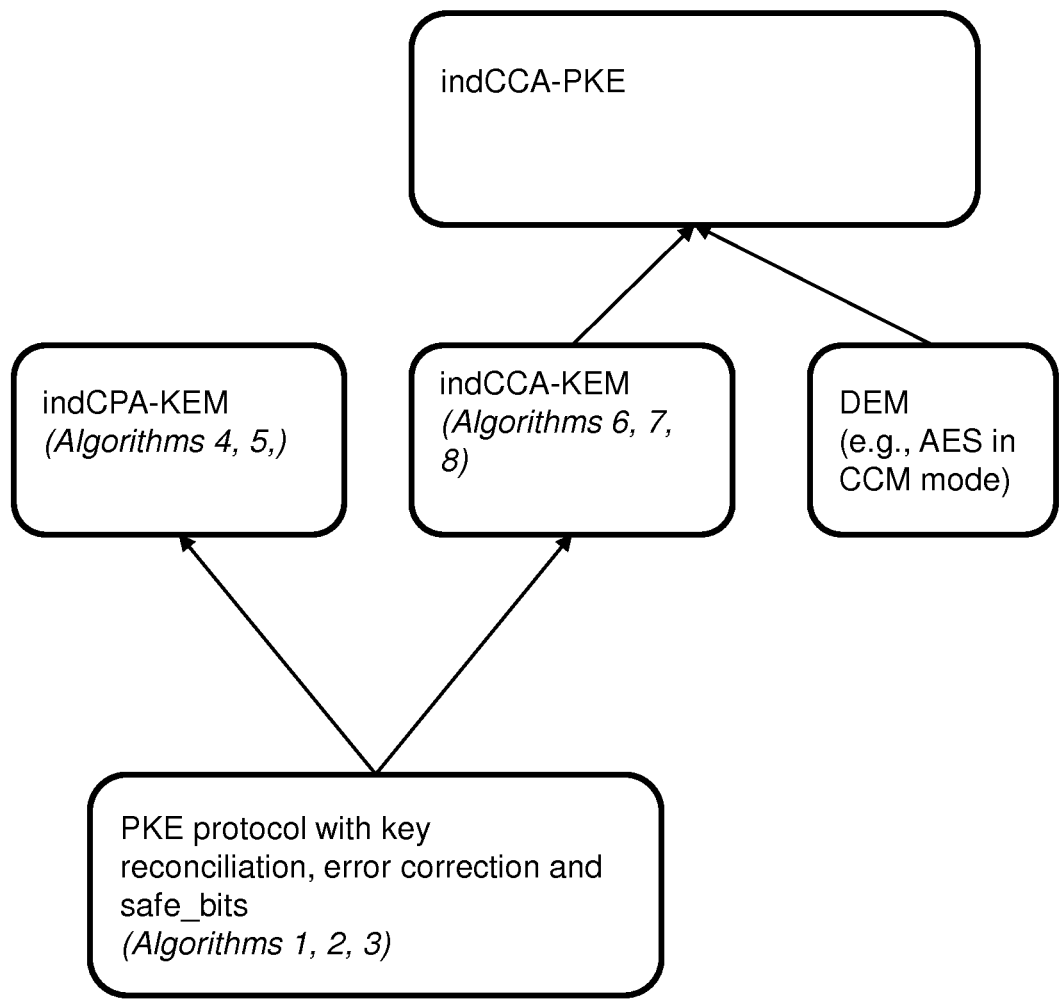

Referring to FIG. 6. We note that given this building block, we can:

Define an indCPA-KEM based on it by hashing K. This may be done identical as in Round2.

Define an indCCA-KEM based on it by applying a standard transformation as the FO transform. This is identical as done in Round2.

Figure 9:
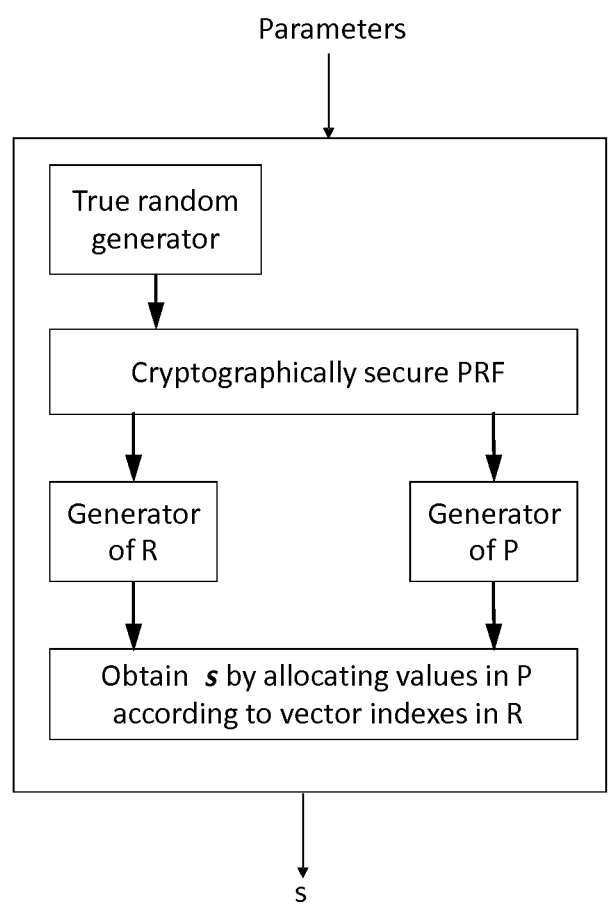
FIG. 9 schematically shows an example of secret generation according to an embodiment, FIG. 10 schematically shows an example of a cryptographic system according to an embodiment, FIG. 11a schematically shows an example of a cryptographic method according to an embodiment, FIG. 11b schematically shows an example of a cryptographic method according to an embodiment, Annex A, which is part of this description, provides schematic mathematical descriptions of examples of embodiments.

FIG. 9 schematically shows an example of secret generation according to an embodiment.

In some protocols, it is advantageous when the secrets, e.g., one or both of the private keys are trinary since then computations can be performed faster with just simple additions and subtractions as in the case of Round2. For example, the coefficients of a private key may be restricted to be either −1, 0, or 1.

On the other hand, it is sometimes advantageous to use secrets that have slightly larger components (not only −1 and 1) since it allows us to deal better with the hybrid attack, the reason being that the overall entropy is higher. In an embodiment, the secrets have a root at one since this property can allow for a lower noise blow-up.

Below we describe a system and methods to generate suitable secrets, e.g., the first and/or second private key. The system is depicted in FIG. 9 in which a generator of secrets s is configured with several parameters such as the length n of s, the range of the elements in s and the distribution of the elements in s. The generator may include a true random generator, usually hardware-based, that is used to obtain a random seed that is used to generate a pseudo-random sequence. Instead of a true random number generator a pseudo random number may be used.

Given the input parameters, the generator obtains a set P containing the input elements that will comprise s. Given the pseudo-random sequence, the generator obtains another set R containing the elements in s that will be combined with elements in P.

The obtained secret s can be stored in memory. The generator can run on the CPU of a computer.

Deterministic Method

The generator may be configured, e.g., by a user, with weights $\{w_0, w_1, \ldots, w_k\}$ such that $w_0 + 2*w_1 + \ldots + 2*w_k = 1$. For example, a user may configure it with value n that determines the length of s.

The secret s with n components will have $h_i$ values $+i$ and $h_i$ values $-i$ where $h_i = \text{floor}(w_i * n)$ for $i = \{-k, \ldots, -1, 1, \ldots, k\}$.

The number of non-zero entries in s is called H and is defined as $H = 2*h_k + \ldots + 2*h_1$.

The sequence of non-zero elements is called P and comprises values $\{-k, \ldots, -1, 1, \ldots, k\}$.

Furthermore, s will have $h_0$ values 0, where $h_0 = n - H$.

Note that instead of floor( ) it is possible to use ceil( ) in which case $w_0$ is preferably large enough so that $H < n$.

The generator initializes vector s of dimension n to zero.

Given values $\{h_0, h_1, \ldots, h_k\}$, the generator randomly generates a sequence R with exactly H distinct integers between 0 and n−1. The generator then assigns the values in P to s according to the values in R:

value−k in P to the vector positions in s indexed by the first $h_k$ values in R, value−(k−1) in P is assigned to the vector positions in s indexed by the following $h_{k-1}$ values in R, value −1 in P is assigned to the vector positions in s indexed by the following $h_1$ values in R, value 1 in P is assigned to the vector positions in s indexed by the following $h_1$ values in R, value 2 in P is assigned to the vector positions in s indexed by the following $h_2$ values in R, and so on till the last $h_k$ values in R are used as index in s and are assigned value k in P.

Probabilistic Method

The generator may be configured with weights $\{w_0, w_1\}$ such that $w_0 + 2*w_1 = 1$. This distribution can be generalized to a higher number of weights as in the previous section.

Given a secret of length n, the generator first computes $h_1 = \lfloor w_i * n \rfloor$ and determines a sequence P with $h_1$ values "+1" and $h_1$ values "−1". Values +/−1 can also be generalized to other values, e.g., +/−k with k a positive integer.

The generator initializes vector s of dimension n to zero.

Given P, the generator randomly generates a set R with $2*h_1$ random values between 0 and n−1. The generator then sequentially takes element i in R and element j in P and assigns $s[i] = s[i] + j$.

Vector s is updated according to the following pseudo-code.

TABLE 1

Pseudo-code for the second method

```
seed = obtain_true_random_seed( )
R = generate_2_h1_pseudo_random_values(seed);
s = 0;
// first part in set P
For i = 0 to h1−1 {
    s[R[i]] = s[R[i]] + 1;
}
// second part in set P
For i = 0 to h1−1 {
    s[R[i+h1]] = s[R[i+h1]] − 1;
}
```

Deterministic Method Leading to a Binomial Distribution

In this third embodiment, compute k/2 vectors $$v_0, \ldots, v_{\frac{k}{2}-1}$$

each of length n with coefficients in $\{0,1\}$, each vector with exactly $p*n = w_1$ non-zero elements where p is the probability of a coefficient being 1. For this, one may randomly select $w_1$ distinct values in $[0, n-1]$ that will be assigned value 1.

compute k/2 vectors of length n $v_{k/2}, \ldots, v_{k-1}$ with coefficients in $\{0,1\}$, each vector with exactly $p*n = w_1$ non-zero elements where p is the probability of a coefficient being 1. For this, one may randomly select $w_1$ distinct values in $[0, n-1]$ that will be assigned value 1.

compute the secret vector s, with n coefficients, where the $i^{th}$ coefficient is computed as:

$$s[i] = v_0[i] - v_{\frac{k}{2}}[i] +$$
$$v_1[i] - v_{\frac{k}{2}+1}[i] +$$
$$\ldots$$
$$v_{\frac{k}{2}-1}[i] - v_{k-1}[i]$$

This follows a distribution that is binomial and centered around 0. It is binomial since of the coefficients of $v_l[i]$ with l=0, . . . , k−1 has a probability p of being 1. In this embodiment, the values 1 in vectors $v_l$ correspond to the set P and the values between 0 and n−1 that are assigned value 1 correspond to set R. The resulting secret has a zero at one since the number of is in each vector $v_l$ is identical and we add k/2 vectors and we subtract k/2 vectors.

Note that in the probabilistic method (c) the integers in R do not need to be distinct so that it is easier to generate them. Note also that elements in R do not need to be computed beforehand, but they can be computed on the fly. If the integers in R are distinct, the deterministic and probabilistic methods yield the same secret s. Note also that the definition of a sequence of values in P (the values that are allocated to the secret) does not need to be done explicitly, but it can be kept implicit in the code as it is illustrated in Table 1.

In embodiments, the two parties generate two raw keys, e.g., polynomials or matrices that are approximately, but not exactly equal. To come to exact agreement, some reconciliation data is sent. A scheme for doing so is explained in a patent application of the same applicant, with title "REACHING AGREEMENT ON A SECRET VALUE", filed at the EPO on 4 Nov. 2016, with application number 16197277.3; for example, the method on pages 7-10 may be used for reconciliation in embodiments. Variants disclosed elsewhere in the cited patent application may also be adopted.

In this application, we will use the following notation for the following three functions:

1. Rounding Function $\lfloor \cdot \rceil_{B,b_h}$: For q, $b_h$, B $\in$ Z, $b_h \geq 1$, B<$\log_2$ q−$b_h$, let $\bar{B}=\log_2$ q−B. Then, $\lfloor \cdot \rceil_{B,b_h}: v \rightarrow \lfloor 2^{-\bar{B}} \cdot v \rceil$ (mod $2^B$)

Intuitively, $\lfloor v \rceil_{B,b_h}$ extracts the B most significant bits of $\{v+2^{\log q-(\bar{B}+b_h)}\}$, where the second component is a rounding factor to ensure unbiased rounding errors. B indicates the number of bits that are extracted form a symbol v, and $b_h$ indicates the number of helper data bits. In an embodiment, q may be a power of 2.

2. Cross-Rounding Function $\langle \cdot \rangle_{B,b_h}$: For q, $b_h$, B $\in$ Z, $b_h > 1$, B<$\log_2$ q−$b_h$, let $\bar{B}=\log_2$ q−B. Then, $\langle \cdot \rangle_{B,b_h}$: $v \rightarrow \lfloor 2^{-\bar{B}+b_h} \cdot v \rfloor$ (mod $2^{b_h}$)

Intuitively, $\langle v \rangle_{B,b_h}$ extracts the $b_h$ least significant bits of the (B+$b_h$) most significant bits of v.

3. Reconciliation Function rec(w,b):

For q, $b_h$, B $\in$ Z, $b_h \geq 1$, B<$\log_2$ q−$b_h$, w $\in Z_q$, b $\in [0,2^{b_h})$, rec(w,b)=$\lfloor v \rceil_{B,b_h}$ where v is the closest element to w such that $\langle v \rangle_{B,b_h}$=b. The closest element w may be taken according to the Lee distance, e.g., min(|v−w|,q−|v−w|).

These three functions can be applied coefficient-wise to polynomials or matrices. The above cited reconciliation function is used as an example, herein. As noted, the reconciliation methods in the above cited application could also be used. The cross-rounding function can be applied to obtain the reconciliation data and the rounding function to obtain the data which is reconciled, e.g., the reliable bits. When the reconciliation data is later used in the reconciliation function, the reconciled data is recovered. In other words: rec(w, $\langle v \rangle$)=$\lfloor v \rceil$, assuming that v and w are within a threshold distance of each other.

In an embodiment, the first and second public key, first and second private key and the raw key are multiple polynomials over a finite field or ring, a public key being obtained from a private key by a noisy multiplication with multiple shared polynomials (a). For example, multiple polynomials may be used in module-lattices in which the elements of the lattice are polynomials.

Figure 7A:
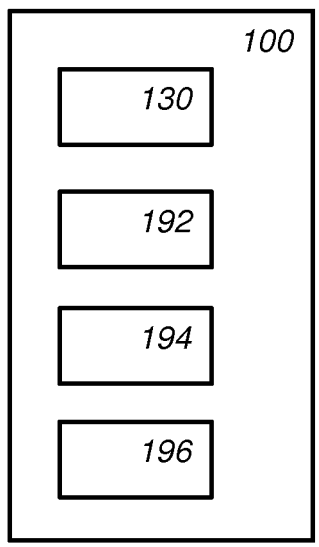
Figure 7B:
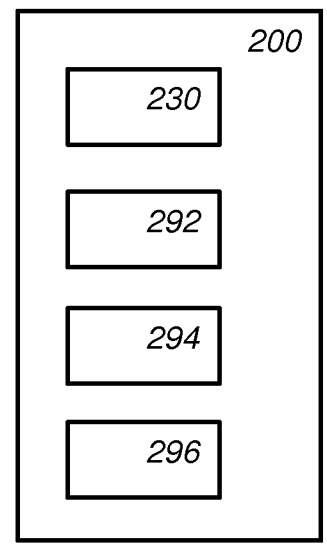
Figure 7C:
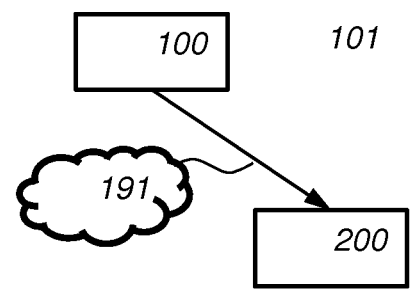

FIG. 7a schematically shows an example of an embodiment of a first party device 100. FIG. 7b schematically shows an example of an embodiment of a second party device 200. FIG. 7c schematically shows an example of an embodiment of a cryptographic system 101 comprising a first device 100 and a second device 200. First device 100, second device 200 may comprise one or more of a storage interface 192, 292, a processor 194, 294, and a memory 196, 296, respectively.

The first device 100, and second device 200, e.g., the various devices of system 101 may communicate with each other over a computer network 191. The computer network may be an internet, an intranet, a LAN, a WLAN, etc. Computer network 191 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 101 as needed. For example, the connection interface may comprise a connector, e.g., a wired connector, e.g., an Ethernet connector, or a wireless connector, e.g., an antenna, e.g., a Wi-Fi, 4G or 5G antenna. For example, first device 100, and second device 200 may comprise communication interface 130, 230 respectively. Computer network 191 may comprise additional elements, e.g., a router, a hub, etc.

The execution of the first device 100, and second device 200 may be implemented in a processor, e.g., a processor circuit, examples of which are shown herein. The first device 100, in particular the processor of first device 100 may implement the functions of the first party 10. The second device 200, in particular the processor of second device 200 may implement the functions of the second party 20. For example, these functions may be wholly or partially be implemented in computer instructions that are stored at device 100, or 200, e.g., in an electronic memory of the device, and are executable by a microprocessor of the device. In hybrid embodiments, functional units are implemented partially in hardware, e.g., as coprocessors, e.g., crypto coprocessors, and partially in software stored and executed on device 100, or 200.

Devices 100, and 200 may comprise a storage interface to store and/or retrieve messages, possibly encrypted messages. For example, the storage interface may be implemented locally, e.g., as an interface to a memory comprised in the device, e.g., memory 196, or 296, respectively. The storage interface may also interface with offline, e.g., non-local, storage, e.g., cloud storage, e.g., a storage such as a memory or a drive located in another device. If cloud storage is used the devices may comprise a local storage as well, e.g., a memory. For example, the memory may be used to store computer programming instructions, temporary storage of files and the like.

In the various embodiments of devices 100 and 200, the communication interface may be selected from various alternatives. For example, the interface may be a network interface to a local or wide area network, e.g., the Internet, a storage interface to an internal or external data storage, an application interface (API), etc.

The devices 100 and 200 may have a user interface, which may include well-known elements such as one or more buttons, a keyboard, display, touch screen, etc. The user interface may be arranged for accommodating user interaction for initiating a key agreement protocol, responding to a key agreement protocol, sending a message encrypted with a public key, decrypting a message with a public key, etc.

Storage may be implemented as an electronic memory, say a flash memory, or magnetic memory, say hard disk or the like. Storage may comprise multiple discrete memories together making up storage. Storage may also be a temporary memory, say a RAM.

Typically, the devices 100 and 200 each comprise a microprocessor which executes appropriate software stored at the devices 100 and 200; for example, that software may have been downloaded and/or stored in a corresponding memory, e.g., a volatile memory such as RAM or a non-volatile memory such as Flash. Alternatively, the devices 100 and 200 may, in whole or in part, be implemented in programmable logic, e.g., as field-programmable gate array (FPGA). Devices 100 and 200 may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, devices 100 and 200 may comprises one or more circuits to implement one or more or all of the functions of the respective device. The circuits may implement the corresponding functions described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

The circuits may also be, FPGA, ASIC or the like.

Figure 10:
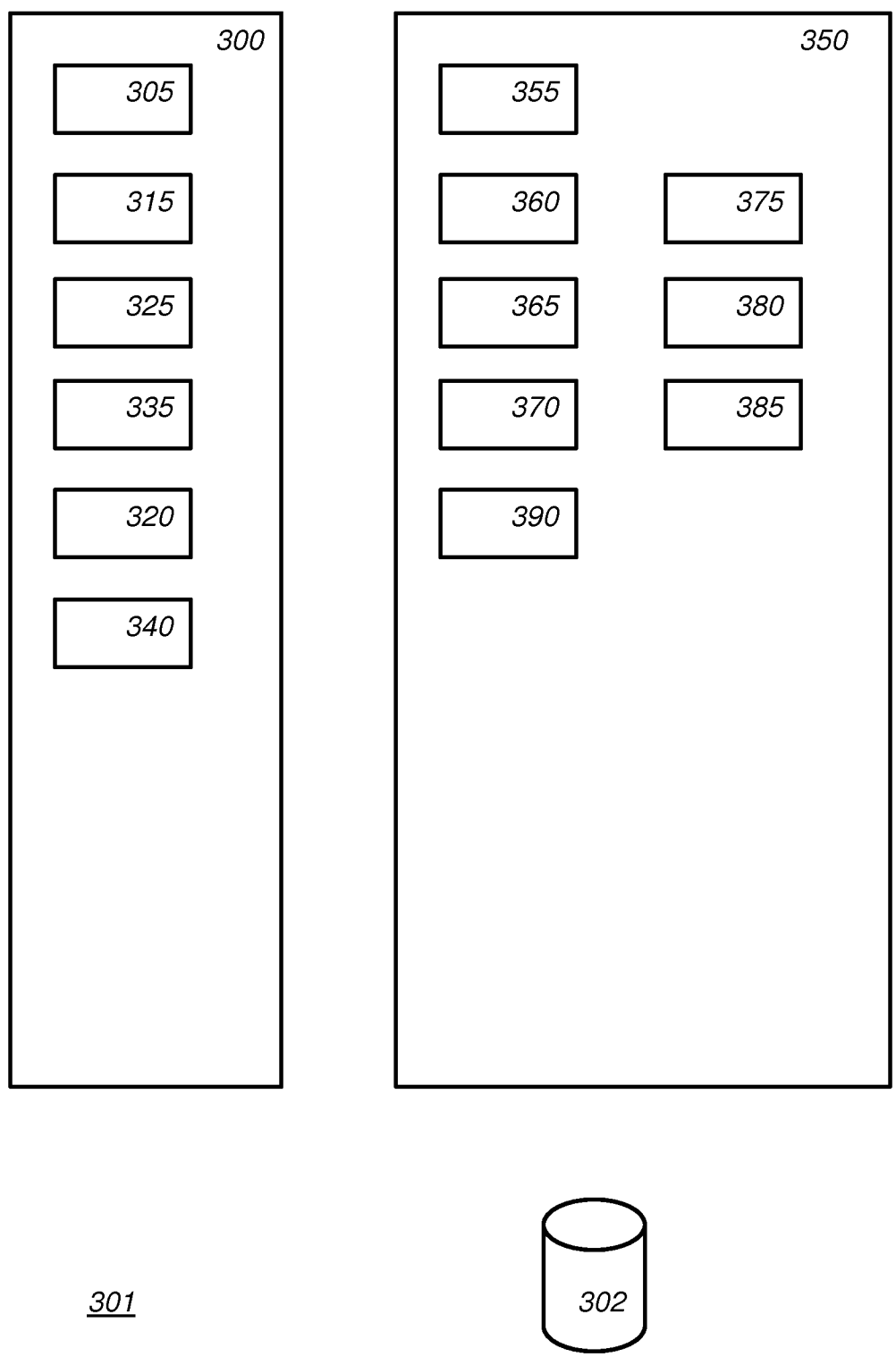

FIG. 10 schematically shows an example of a cryptographic system 301 according to an embodiment. System 301 comprises a first cryptographic device 300, a second cryptographic device 350 and optionally a public key depository 302. For example, the first device 300 and second device 350 on a device such as first device 100 and/or second device 200.

First and second device 300 and 350 are configured to perform a cryptographic protocol. They have the ability to securely pass data from one device to the other. Various cryptographic protocols may use this same ability. As an example, two protocols are described that use this ability.

For example, the first and second device may be configured for a key agreement protocol, e.g., designed to generate a key, typically a symmetric key, that is shared between the two devices. The shared key may then be used by the devices for protected communication, e.g., encrypted and/or authenticated communication, e.g., by using the key for encryption of messages and/or for computing an authentication tag for a message. The protocol may be a public key encryption protocol, e.g., designed to allow other devices, say second device 350, to encrypt a message (m) such that a particular device, say first device 300 can decrypt them. However, the contents of the public-key encrypted message cannot be obtained by other devices than the encrypting and decrypting device, e.g., second device 350 and first device 300. In case of public key encryption, the same public key of the first device, e.g., the same first public key and public object, may be used by multiple second devices to send encrypted messages to the first public device. Even if two second devices use the same public key to encrypt a message, they cannot decrypt the other's communication.

The first device 300 and second device 350 comprise a communication interface 305 and 355 respectively. The communication interfaces are configured to communicate with each other. Examples, of communication interfaces, e.g., over wired or wireless networks, are described herein.

First device 300 comprises a public/private key generator 315 configured to generate a first private key (r) and a first public key (b) derived from the first private key. Deriving the public key from the private key may use a public object (a). For example, generating the public key may involve multiplication with the public object, and/or introducing some type of noise, e.g., scaling down the multiplication result, adding a noise term, etc. The private key and public object may be a polynomial or a matrix, e.g., over a finite field or ring.

The first private and public key may be generated ephemerally. For example, the latter may be done for a key agreement protocol, especially, if the first and second device use some other authentication mechanism, e.g., an out of band mechanism, e.g., certificate based authentication or the like, to authenticate each other. The first private and public key may also be generated for longer term use. For example, the first public key may be stored in an external public key depository 302. Public key depository 302 may also store the public object (a) or seed therefor.

The first public key is transferred from the first device 300 to the second device 350, e.g., through communication interfaces 305 and 355. This may be done by direct communication, or indirect, e.g., through public key depository 302. Together with the first public key, also the public object (a), may also be transferred, if needed. For example, the public object may be transferred by sending a seed from which the public object (a) may be generated.

Second device 350 may comprise a public key obtainer 360, e.g., configured to retrieve the first public key from public key depository 302. For example, this type of obtaining is suitable for public key encryption. However, the public key may also be obtained directly from the first device, possibly out-of-bound, e.g., in an email. The public key may be stored until needed for a public key encryption exchange. However, the first public key may also be received for immediate use, e.g., for a key sharing operation, e.g., in this case the first public key and/or public object, may be ephemerally generated.

Second device 350 may comprise a public/private key generator 365 configured to generate a second private key (s) and to generate a second public key (u) from the second private key (s). The second public key uses the same public object as generating the first public key did. The first and second private keys are private to their respective devices. They may be shared with trusted parties if needed, e.g., for back-up, key escrow, etc. The public keys, and the public object are not necessarily secret for security; nevertheless one or more of them may still be private to first and second device if desired. For example, the first public key may only be shared with the second device, and vice versa.

Second device 350 comprises a code word generator 370. Code word generator 370 is configured to generate a code word according to an error correcting code. The error correcting code may be a linear code or a non-linear code. For example, the error correcting code may be a BCH code, a Reed-Solomon code, Hadamard code, and the like. Multiple codes may be concatenated. Concatenated codes are error-correcting codes that are constructed from two or more simpler codes in order to achieve good performance with reasonable complexity. For example, a Hadamard code may be concatenated with a BCH code.

Encoded in the code word is the data for encapsulation. For example, code word may be partitioned into a data part, e.g., data bits and a parity part, e.g., parity bits. For example, the data for encapsulation may be comprised in the data bits. One way to generate a code word is to generate a data part and compute parity bits from the data part. For example, a data vector with data bits may be matrix multiplied by a parity matrix to obtain the parity bits, or even the full code word. The code word may be obtained by combining the data for encapsulation and the parity bits. For example, the data part and the parity part may be concatenated, although any permutation of data bits and parity bits may be used to produce a valid code word according to a corresponding error correcting code. For example, data bits and parity bits may be alternated. Note that reconciliation data is typically computed on single q-ary symbols, but parity data is typically computed from multiple bits; note that q is much larger than 2.

The code word may be used in various ways. For example, a message to be delivered from second device 350 to first device 300 may be encoded in the data part of the code word as the data to be encapsulated. This way of encoding is, for example, suitable for public key encryption. Public key encryption may also be obtained by encrypting the message (m) at the second device 350, e.g., by a symmetric key, e.g., randomly generated for this purpose, and encoding the encrypting symmetric key in the code word. An additional key derivation step may be used. For example, a random pre-key may be encoded in the code word, and the encrypting key may be derived from the pre-key. For example, deriving may use a key derivation function (KDF), e.g., a hash function. For example, in the latter case, the encrypted message may be sent from the second device to the first device together with the required data for decrypting the data, e.g., the second public key, and other data, as described below.

Interestingly, the code word is generated independent from first private key, first public key, second private key and second public key. Because of this, the protocol has increased resistance against active attacks. An attacker has fewer possibilities to influence the shared key since it cannot influence the key through the choice of the first and second private keys.

Independent generation may be obtained, e.g., in case of a message, if the message is generated from an application that is independent from the public key encryption, e.g., a financial or communication application, etc. Independent generation may be obtained, e.g., by random generation. For example, the key or pre-key in the code word may be generated independently, e.g., using a true random number generator, or using a pseudo random generator using a seed that is independent from the first and second private key, e.g., which is itself randomly generated, or pre-determined or the like. For example, the code word may be generated at the second device even before the first public key is received and/or before the second private key is generated; this also ensures independence.

Second device 350 comprises a Diffie-Hellman unit 375. Diffie-Hellman unit 375 is configured to generate a second raw shared key (k*) from the first public key (b) and the second private key (s). For example, the Diffie-Hellman unit 375 may be configured to apply a Diffie-Hellman function to the first public key and the second private key. For example, the Diffie-Hellman function may be multiplication or exponentiation depending on the underlying mechanism. Second device 350 is configured to transfer its second public key to the first device 300. First device 300 comprises a Diffie-Hellman unit 325. Diffie-Hellman unit 325 is configured to generate a first raw shared key (k') from the second public key (u) and the first private key (r), e.g., by applying the same Diffie-Hellman function. Unfortunately, for some types of Diffie-Hellman functions it may happen that the first and second raw keys are close to each other, though not necessarily identical. The particular likelihood of this happening depends on the underlying Diffie-Hellman function. Some likelihood of different raw keys may be accepted in most applications, however, how high this likelihood may be will depend on the application. Typically though, a lower likelihood will be preferred. The raw key may be of the same mathematical type, e.g., polynomial or matrix, as the private and public keys.

Second device 350 comprises a reliable bit generator 380 and a reconciliation data generator 385. Reliable bit generator 380 is configured to apply a reliable bit function to the second raw shared key (k*) to obtain reliable indices and reliable bits derived from the indicated coefficients. The reliable indices indicate the coefficients of the raw shared key. For example, the reliable bit generator 380 may determine which coefficients in the raw key are close to a sampling border and which are not. For example, the coefficients in the raw key which are within a threshold of a sampling border may be discarded as unreliable. The remaining, reliable, coefficient may be indicated by the reliable indices. The reliable bits may be obtained by sampling the reliable coefficients.

In case not enough coefficients remain, there are several possibilities, e.g., terminating the protocol, restarting the protocol with a new first and/or second private key, and/or new public object, deriving a shorter key, or discarding fewer coefficients. Instead of selecting all coefficients within a threshold, one may also select a pre-determined number of coefficients, e.g., mu coefficients, and select the most reliable coefficients, e.g., the first mu most reliable coefficients.

One way to implement reliable bits is take one or more, say B, most significant bits of a coefficients. For example, the number of reliable bits per selected coefficients may be, say, 1, or 2. In some embodiments, e.g., when large polynomials or matrices are used the number of coefficients is large, which allows a high reliability, e.g., a low value for B. For other embodiments, e.g., for IoT devices larger values for B may be used. The computations in a finite ring may be done in the finite ring of the integers modulo a power of 2. The latter choice has the advantage of a more even distribution in the reliable bits.

Reconciliation data generator 385 is configured to generate reconciliation data (h) for the indicated coefficients of the raw shared key. The reconciliation data comprising information allowing reducing of differences between the first and second raw key derived at the first and second device. For example, applying reconciliation data may cause the difference, e.g., the Lee distance, between a coefficient of the raw keys at the first and second device to be reduced, thus increasing the probability that both will produce the same reliable bit. Both the parity bits in the code word and the reconciliation data server to reduce noise, however, the parity bits are computed over multiple data bits, whereas the reconciliation data is computed over coefficients in a raw shared key. The reconciliation data further increase the reliability of the reliable bits.

One way to implement reconciliation data is take one or more, say $b_h$, bits of a coefficients that follow the bits taken as reliable bits. For example, these may be the $b_h$ bits that follow the B bits in significance. For example, the number of reconciliation bits per selected coefficients may be, say, 1, or 2. A smaller number of reconciliation bits has the advantage of reducing communication overhead. A larger amount of reconciliation bits is possible though.

Second device 350 may comprise an encapsulator 390. Encapsulator 390 is configured to encapsulate the code word with the reliable bits by applying an encapsulation function, e.g., an XOR. The encapsulation may be one-time pad encapsulation. In an embodiment, the encapsulation function obtains perfect security, in the sense that the information on the code word that can be obtained from the encapsulated the code word is zero without knowing reliable bits. For example, an XOR function may be used, on one of the other encapsulation functions described herein.

Note that the encapsulation applies to the whole code word, including data bits and parity bits, and not just to parity bits. Furthermore, encapsulation is applied to generated data e.g., a message, a key, a pre-key, etc. not to data derived from one or more of the first or second public or private keys.

The second device is configured to transfer the second public key (u), the reconciliation data (h), the encapsulated data (c), and the reliable indices to the first device. The transferring may be in response to receiving the first public key, e.g., in case of key agreement, or not, e.g., in case of public key encryption.

The first device 300 is configured to receive from the second device a second public key (u), reconciliation data (h), and encapsulated data (c), and reliable indices. First device 300 comprises a reconciliation unit 335 configured to apply the reconciliation data (h) in a reconciliation function to the coefficients in the first raw shared key (k') indicated by the reliable indices (safe_bits), obtaining reliable bits (k). For example, a coefficient indicated as reliable may be reconciled using the reconciliation bits and then sampled to obtain a reliable bit.

First device 300 comprises a decapsulation unit 340 configured to decapsulate the encapsulated data (c) obtaining a near-code word using the reliable bits. The reason the code word of the second device may not be obtained directly is that even with reliable bits and reconciliation there may still be differences between the raw keys that are not resolved. First device 300 comprises an error corrector 320 that is configured to apply an error correction function to the near-code word obtaining a code word.

Finally, the code word may be decoded, e.g., to obtain the data part and thus obtain the message (m), the key (K) or pre-key. In the first case some action may be taken based on the message, e.g., the message may be displayed, e.g., in a communicator app. In the second case, the key may be used for further protected communications, etc. In the third case, a key derivation function may be applied to the pre-key to obtain a shared key.

Below a small but illustrative example is given for reliability, and reconciliation. We will take $q=2^5=32$, and $B=b_h=1$. We will write coefficients as a five bit sequence, with the most significant bit at the left. For example, in an embodiment, the second device may discard coefficients 00000, 00001, 01110, 01111, 10000, 10001, 11110, and 11111 since only a small addition or subtraction to such coefficients will cause them to flip the most significant bit.

The coefficients that would not be discarded are 00010, 00011, . . . , 01101, and 10010, 10011, . . . , 11101. Coefficients in the first list would give a reliable bit of 0, and coefficients in the last list would give a reliable bit of 1. The second bit of these sequences may be taken as the reconciliation data. The reconciliation data of selected coefficients are transferred to the other device, but the reliable bits are not.

After the first device computes its raw key it selects coefficients according to the coefficients indicated by the first device. Suppose for example, a coefficient in the raw key of the first device is 01101 and that the reconciliation data for that coefficient is 0. Since the second bit of the coefficient at the first device is not 0, this indicates to the first device that an error was made. The nearest value to selected coefficient 01101 with a second bit of 0, and which would not have been discarded, is 10010. Note that 00111 also has a second bit of 0, but is further from selected coefficient 01101. First device will thus select a 1 as reliable bit for this selected coefficient.

Note that if the noise was large, this correction may be wrong; it is conceivable that the second device had coefficient 00111. In such a case a wrong reliable bit is selected. Interestingly, even with moderate amounts of reconciliation data, these types of errors are rare. This means that rather than increasing the amount of reconciliation data, it is more efficient to rely on error correcting codes to correct the remaining number of errors. Minimizing Lee distance may simply be done by trying candidate modified coefficients at increasing Lee distance until a match is found. More advanced algorithms are also possible, e.g., a described in the art.

There is an interesting synergy between reliability and reconciliation. It may happen that the closest modified coefficient with the correct reconciliation data would have been discarded by the second cryptographic device. The closest modified coefficient with the correct reconciliation data and the additional constraint that it would not have been discarded by the second cryptographic device may have a different reliable bit. Taking this into account further increases the efficacy of the reconciliation bits. For example, continuing the example above, consider that the second device obtains the coefficient 01100, with reconciliation data 0. The closest modified coefficient would be 10000, but the closest coefficient that would not have been discarded is 00111. Accordingly, the first device recovers the reliable bit 0 rather than 1.

Figures 11A, 11B:
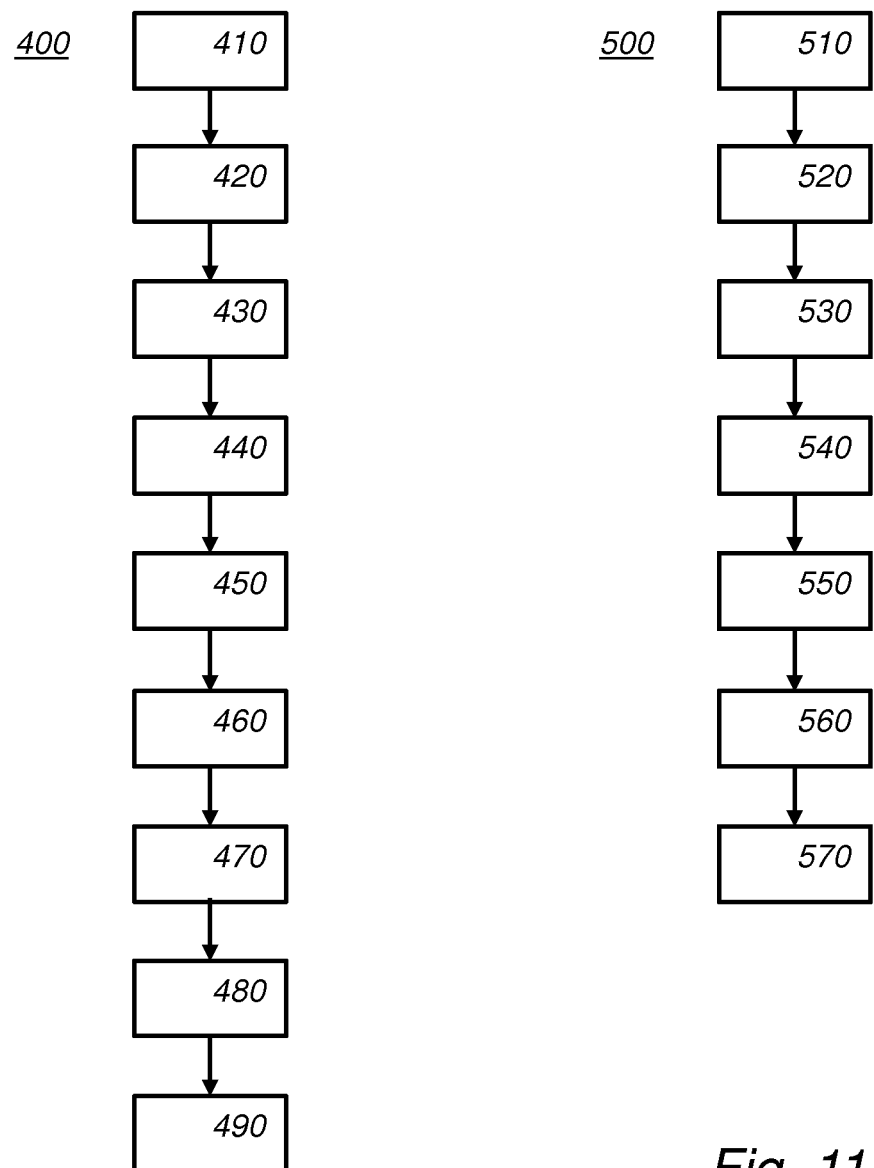

FIG. 11*a* schematically shows an example of a cryptographic method 400 according to an embodiment. Method 400 is arranged for sharing a code word. Method 400 comprises communicating (410) with a first cryptographic device (10), receiving (420) a first public key (b) from the first cryptographic device, generating (430) a second private key (s) and generating a second public key (u) from the second private key (s), generating (440) a code word (K‖parity) according to an error correcting code, and, generating (450) a second raw shared key (k*) from the first public key (b) and the second private key (s), applying (460) a reliable bit function (shared_bits) to the second raw shared key (k*) obtaining reliable indices, indicating coefficients of the raw shared key, and reliable bits derived from the indicated coefficients, generating (470) reconciliation data (h) for the indicated coefficients of the raw shared key, the reconciliation data comprising information allowing reducing of differences between the first and second raw key derived at the first and second device, encapsulating (480) the code word with the reliable bits by applying an encapsulation function, obtaining encapsulated data (c), transferring (490) the second public key (u), the reconciliation data (h), the encapsulated data (c) and the reliable indices to the first device.

FIG. 11*b* schematically shows an example of a cryptographic method 500 according to an embodiment. Method 500 is arranged for sharing a code word, Method 500 comprises communicating (510) with a second cryptographic device (20), obtaining (520) a first private key (r) and a first public key (b) derived from the first private key, transferring the first public key (b) to the second device, receiving (530) from the second device a second public key (u), reconciliation data (h), and encapsulated data (c), and reliable indices, generating (540) a first raw shared key (k') from the second public key (u) and the first private key (r), applying (550) the reconciliation data (h) in a reconciliation function to the coefficients in the first raw shared key (k') indicated by the reliable indices (safe_bits), obtaining reliable bits (k)

decapsulating (560) the encapsulated data (c) obtaining a near-code word using the reliable bits, applying (570) an error correction function to the near-code word obtaining a code word.

The code word in method 400 or 500 may be used to transfer a message or a key used for encrypting a method, e.g., in a public key encryption method. The code word may be used to agree on a shared key.

Many different ways of executing the methods are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. For example, some parts may be executed, at least partially, in parallel. Moreover, a given part may not have finished completely before a next step is started.

Embodiments of the method may be executed using software, which comprises instructions for causing a processor system to perform the method. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 8A:
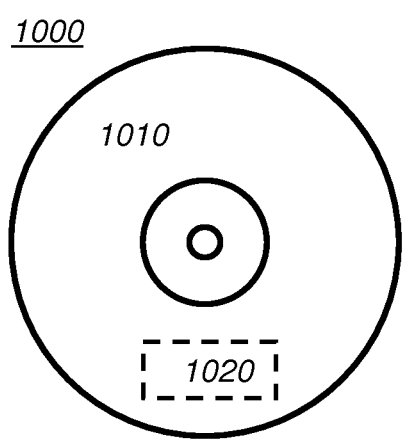

FIG. 8*a* shows a computer readable medium 1000 having a writable part 1010 comprising a computer program 1020, the computer program 1020 comprising instructions for causing a processor system to perform a key agreement method or public key encryption method or public key decryption method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said key agreement method or public key encryption method or public key decryption method.

Figure 8B:
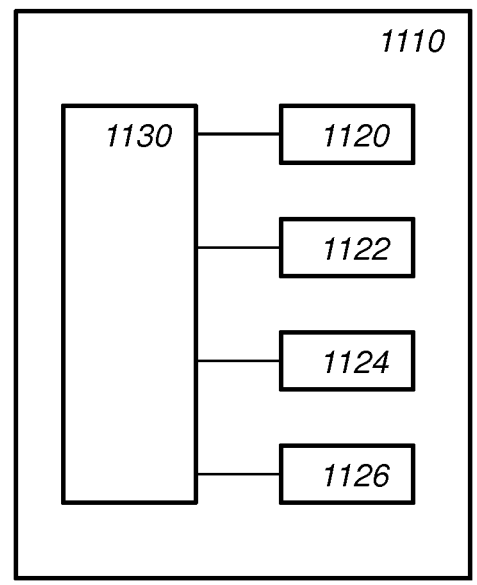

FIG. 8*b* shows in a schematic representation of a processor system 1140 according to an embodiment of a device, e.g., a key agreement device or a public key encryption or decryption device. The processor system comprises one or more integrated circuits 1110. The architecture of the one or more integrated circuits 1110 is schematically shown in FIG. 8*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the key agreement device or a public key encryption or decryption device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

The following numbered clauses are not the claims, but include contemplated embodiments. The Applicant hereby gives notice that new claims may be formulated to such clauses and/or combinations of such clauses and/or features taken from the description or claims, e.g., during prosecution of the present application or of any further application derived therefrom.

1. A second cryptographic device (20) comprising
    a communication interface configured to communicate with a first cryptographic device (10),
    a processor configured to
        obtain a first public key (b) for the first cryptographic device,
        generate a second private key (s), a code word according to an error correcting code, and generate a second public key (u) from the second private key (s),
        generate a second raw shared key (k*) from the first public key (b) and the second private key (s),
        apply a reliable bit function to the second raw shared key (k*) obtaining reliable indices, indicating coefficients of the raw shared key, and reliable bits derived from the indicated coefficients,
        generate reconciliation data (h) for the indicated coefficients of the raw shared key, the reconciliation data comprising information allowing reducing of differences between the first and second raw key derived at the first and second device,
        encapsulate the code word using the reliable bits by applying an encapsulation function, obtaining encapsulated data (c),
        transfer the second public key (u), the reconciliation data (h), the encapsulated data (c), and the reliable indices to the first device.

2. A first cryptographic device (10) comprising
    a communication interface configured to communicate with a second cryptographic device (20),
    a processor configured to
        obtain a first private key (r) and a first public key (b) derived from the first private key, transfer the first public key (b) to the second device,
        receive from the second device a second public key (u), reconciliation data (h), and encapsulated data (c), and reliable indices,
        generate a first raw shared key (k') from the second public key (u) and the first private key (r),
        apply the reconciliation data (h) in a reconciliation function to the coefficients in the first raw shared key (k') indicated by the reliable indices, obtaining reliable bits (k)
        decapsulate the encapsulated data c) using the reliable bits (k), obtaining a near-code word,
        apply an error correction function to the near-code word obtaining a code word.

3. A cryptographic method (400) for sharing a code word, the method comprising
    communicating (410) with a first cryptographic device (10),
    receiving (420) a first public key (b) for the first cryptographic device,
    generating (430) a second private key (s) and generating a second public key (u) from the second private key (s),
    generating (440) a code word according to an error correcting code, and,
    generating (450) a second raw shared key (k*) from the first public key (b) and the second private key (s),
    applying (460) a reliable bit function to the second raw shared key (k*) obtaining reliable indices, indicating coefficients of the raw shared key, and reliable bits derived from the indicated coefficients,
    generating (470) reconciliation data (h) for the indicated coefficients of the raw shared key, the reconciliation data comprising information allowing reducing of differences between the first and second raw key derived at the first and second device,
    encapsulating (480) the code word using the reliable bits by applying an encapsulation function, obtaining encapsulated data (c),
    transferring (490) the second public key (u), the reconciliation data (h), the encapsulated data (c) and the reliable indices to the first device.

4. A cryptographic method (500) for sharing a code word, the method comprising
    communicating (510) with a second cryptographic device (20),
    obtaining (520) a first private key (r) and a first public key (b) derived from the first private key, transferring the first public key (b) to the second device,
    receiving (530) from the second device a second public key (u), reconciliation data (h), and encapsulated data (c), and reliable indices,
    generating (540) a first raw shared key (k') from the second public key (u) and the first private key (r),
    applying (550) the reconciliation data (h) in a reconciliation function to the coefficients in the first raw shared key (k') indicated by the reliable indices, obtaining reliable bits (k)
    decapsulating (560) the encapsulated data (c) using the reliable bits, obtaining a near-code word,
    applying (570) an error correction function to the near-code word obtaining a code word.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

Annex A

Schematic mathematical descriptions of examples of embodiments.

The algorithms describe a public-key encryption scheme CPAPKE which is INDCPA secure. A CPAKEM may be constructed from CPAPKE in a black-box manner, and an INDCCA2 secure key-encapsulation mechanism CCAKEM constructed from CPAPKE, e.g., by applying the Fujisaki-Okamoto transform.

CPAPKE uses public parameters that are integers n; q; p; bh; κ; μ, and algorithms for key-generation, encryption and decryption. Ds is a distribution from which coefficients of the secret-key may be drawn, and is parametrized by η. For example, if Ds is the distribution of sparse-trinary vectors, then η represents the Hamming weight of the vectors. fr is a deterministic function that given a seed ρ samples a fresh secret-key from the distribution Ds. Acting on a polynomial of degree at most n. The function SafeBits chooses the μ≤n coefficients that result in the least overall probability of decryption failure, along with a positions/indices, e.g., in a vector, that represents which μ coefficients were chosen.

CPAKEM is a passively secure key-encapsulation mechanism built using CPAPKE in a black-box manner. It reuses the key-generation algorithm of the scheme CPAPKE, and additionally comprises algorithm for encapsulation and decapsulation, the parameters of the previous scheme, and the hash function H from * bits to κ bits.

CCAKEM may be obtained by applying the Fujisaki-Okamoto transform on CPAPKE and may use the hash functions H as defined in CPAKEM and additionally the hash function G form * bits to 3 times κ bits.

---

Algorithm 1: CPAPKE.Keygen( )

parameters: Integers n, q, p, $b_h$, κ, ρ, μ.
input : -
output : pk = (σ, b) ∈ {0, 1}$^κ$ × $\mathcal{R}_{\Phi,p}$, sk ∈ $D_s$ 1   $\sigma \xleftarrow{\$} \{0, 1\}^\kappa$ 2   a = KDF(σ) ∈ $\mathcal{R}_{\Phi,q}$ 3   $r \xleftarrow{\$} D_s(\eta)$ 4   $b = \left(\left\lfloor \frac{p}{q} \cdot \langle ar \rangle_q \right\rceil\right)_p$ (mod Φ(x)) ∈ $\mathcal{R}_{\Phi,p}$ 5   return (pk = (σ, b), sk = r)

---

Algorithm 2: CPAPKE.Enc(m, pk, ρ)

parameters: Integers n, q, p, $b_h$, κ, μ.
input : m ∈ {0, 1}$^κ$, pk = (σ, b) ∈ {0, 1}$^μ$ × $\mathcal{R}_{\Phi,p}$, ρ ∈ {0, 1}$^μ$
output : ct = (u, h, c, safe_bits) ∈ $\mathcal{R}_{\Phi,p}$ × $\mathbb{Z}_{2^{b_h}}^\mu$ × {0, 1}$^μ$ × {0, 1}$^n$ 1   a = KDF(σ) ∈ $\mathcal{R}_{\Phi,q}$
2   s = $f_r$(ρ) ∈ $D_s(\eta)$
3   $u = \left(\left\lfloor \frac{p}{q} \cdot \langle as \rangle_q \right\rceil\right)_p$ (mod Φ(x)) ∈ $R_{\Phi,p}$
4   ($rk_b$, safe_bits) = (SafeBits$_\mu$(bs mod Φ(x))$_p$ ∈ $\mathbb{Z}_p^\mu$ × {0, 1}$^n$
5   (k, h) = HelperData ($rk_b$) ∈ {0,1}$^μ$ × $\mathbb{Z}_{2^{b_h}}^\mu$
6   c = Encode(m) ⊕ k ∈ {0, 1}$^μ$
7   return ct = (u,h,c, safe_bits)

---

Algorithm 3: CPAPKE.Dec(sk, ct)

parameters: Integers n,q,p,$b_h$,κ,ρ,μ.
input: sk = r ∈ $D_s$,
ct = (u, h, c, safe_bits) ∈ $\mathcal{R}_{\Phi,p}$ × $\mathbb{Z}_{2^{b_h}}^\mu$ × {0, 1}$^n$
output: m ∈ {0,1}$^κ$ 1   $\tilde{k}$ = Reconcile(ur mod Φ(x), safe_bits, h) ∈ {0, 1}$^μ$
2   $\hat{m}$ = Decode (c ⊕ $\tilde{k}$) ∈ {0,1}$^κ$
3   return $\hat{m}$

---

Algorithm 4: CPAKEM.Encaps(pk)

parameters: Integers n, q, p, $b_h$, k, μ.
input: pk = (σ, b) ∈ {0,1}$^μ$ × $\mathcal{R}_{\Phi,p}$
output: ct = (u, h, c, safe_bits) ∈ $\mathcal{R}_{\Phi,p}$ × $\mathbb{Z}_{2^{b_h}}^\mu$ × {0, 1}$^μ$ × {0, 1}$^n$ 1   $k \xleftarrow{\$} \{0, 1\}^\kappa$ 2   $\rho \xleftarrow{\$} \{0, 1\}^\kappa$ 3   ct = CPAPKE.Enc(k, pk, p)
4   return (ct, K = H (k, ct))

---

Algorithm 5: CPAKEM.Decaps(sk, ct)

parameters: Integers n, q, p, $b_h$, κ, ρ, μ.
input : sk ∈ $D_s$,
ct = (u, h, c, safe_bits) ∈ $\mathcal{R}_{\Phi,p}$ × $\mathbb{Z}_{2^{b_h}}^\mu$ × {0, 1}$^μ$ × {0, 1}$^n$
output : K ∈ {0, 1}$^κ$ 1   k = CPAPKE.Dec(sk, ct)
2   return K = H(k, ct)

---

Algorithm 6: CCAKEM.Keygen( )

parameters: Integers n, q, p, $b_h$, κ, ρ, μ.
input : -
output : pk = (σ, b) ∈ {0, 1}$^κ$ × $\mathcal{R}_{\Phi,p}$,
sk ∈ $D_s$ × {0,1}$^κ$ × {0, 1}$^μ$ × $\mathcal{R}_{\Phi,p}$ 1   (pk, sk$_{CPA}$) = CPAPKE.Keygen( )

2   $z \xleftarrow{\$} \{0, 1\}^\kappa$ 3   return (pk, sk$_{CPA}$, z, Pk))

---

Algorithm 7: CCAKEM.Encaps(pk)

parameters: Integers n, q, p, $b_h$, κ, ρ, μ.
input : pk = (σ, b) ∈ {0, 1}$^κ$ × $\mathcal{R}_{\Phi,p}$,
output : ct = (u,h c, safe_bits, g) ∈ $\mathcal{R}_{\Phi,p}$, $\mathbb{Z}_{2^{b_h}}^\mu$ × {0, 1}$^n$ × {0, 1}$^κ$, K ∈ {0, 1}$^κ$ 1   $k \xleftarrow{S} \{0, 1\}^\kappa$ 2   (L, ρ, g) = G (k, pk)
3   (u, h, c, safe_bits) = CPAPKE.Enc(k, pk, ρ)
4   return (ct = (u, h, c, safe_bits, g), K = H (L, ct))

---

Algorithm 8: CCAKEM. Decaps(sk, ct)

parameters: Integers n, t 7, p, bh , ti: , p, I-1.
input: sk = (sk$_{CPA}$,z,pk) ∈ $D_s$ × {0,1}$^k$ × {0,1}$^μ$ × $\mathcal{R}_{\Phi,p}$,
ct = (u, h, c, safe_bits, g) ∈ $\mathcal{R}_{\Phi,p}$ × $\mathbb{Z}_{2^{b_h}}^\mu$ × {0,1}$^μ$
×{0,1}$^n$ × {0,1}$^κ$
output: K ∈ {0,1}$^κ$ 1   k' = CPAPKE.Dec(sk , ct)
2   (L', ρ', g') = G (k', pk)
3   (u', h', c', safe_bits') = CPAPKE.Enc(k',pk,ρ')
4   if (u', h', c', safe_bits') == (u, h, c, safe_bits) then
5     return K = H (L,u, h, c,safe_bits,g)
6   else
7     return K = H (z,u,h, c,safe_bits,g)
8   end if

The invention claimed is:

1. A second cryptographic device comprising:
a communication interface circuit, wherein the communication interface circuit is arranged to communicate with a first cryptographic device; and
a processor circuit,
wherein the processor circuit is arranged to obtain a first public key,
wherein the first public key is associated with the first cryptographic device,
wherein the processor circuit is arranged to generate a second private key,
wherein the processor circuit is arranged to generate a code word according to an error correcting code,
wherein the processor circuit is arranged to generate a second public key from the second private key, wherein the code word is generated independently from the first public key, the second private key, and the second public key,
wherein the processor circuit is arranged to generate a second raw shared key from the first public key and the second private key,
wherein the first public key, the second public key, the second private key and the second raw shared key are one or more polynomials over a ring, and the second public key is obtained from the second private key by a noisy multiplication with one or more shared polynomials, or the first public key, the and second public key, the second private key and the second raw shared key are a matrix over a ring, and the second public key is obtained from the second private key by a noisy multiplication with a shared matrix,
wherein the processor circuit is arranged to encapsulate the code word using the second raw shared key, wherein the encapsulating comprises by applying an encapsulation function to obtain encapsulated data,
wherein the encapsulated data comprises a data,
wherein the processor circuit is arranged to transfer the second public key and the encapsulated data to the first device.

2. The second cryptographic device as in claim 1,
wherein the processor circuit is arranged to obtain the code word by obtaining the data and generating parity bits for the data,
wherein the code word is obtained by combining the data and the parity bits.

3. The second cryptographic device as in claim 1,
wherein the second cryptographic device is arranged for a key agreement protocol,
wherein the second device is arranged to derive a shared cryptographic key from at least the data,
wherein the first private key is generated ephemerally,
wherein the first private keys is used to generate the shared key and the first public key,
wherein the first public key is received by the second cryptographic device from the first cryptographic device.

4. The second cryptographic device as in claim 1,
wherein a message is encoded in the code word, or a message is encrypted with a shared symmetric key,
wherein the shared symmetric key is derived from a at least the data, wherein the encrypted message is sent with the second public key from the second device to first device.

5. The second cryptographic device as in claim 1,
wherein the second cryptographic device is arranged, to derive the code word at least in part randomly.

6. The second cryptographic device as in claim 1,
wherein a raw shared key is obtained by multiplying a received public key with a private key.

7. The second device as in claim 1,
wherein a reconciliation data is obtained from at least multiple coefficients of the first shared raw key,
wherein the reconciliation data is obtained, sent, received, and/or applied for fewer than all coefficients of the raw key.

8. The first device as in claim 1,
wherein the second raw shared key comprises indicated coefficients, wherein the reliable bits are at least a portion of the most significant bits of the indicated coefficients,
wherein a reconciliation data for an indicated coefficients are at least a portion of the bits of the indicated coefficients following the reliable bits in significance,
wherein one or more least significant bits of the indicated coefficients may be discarded.

9. The second device as in claim 1,
wherein the processor circuit is arranged to select at least one coefficients in the first shared raw key are indicated by at least a portion of reliable indices,
wherein the processor circuit is arranged to replace the selected coefficients with modified coefficients agreeing with corresponding reconciliation data and minimizing the lee-distance between the selected coefficient and the modified coefficient,
wherein the processor circuit is arranged to obtain reliable bits as one or more most significant bits of the modified coefficients.

10. The second device as in claim 1,
wherein the processor circuit is arranged to select at least a portion of modified coefficients agreeing with the corresponding reconciliation data that would not have been discarded by the first device,
wherein the processor circuit is arranged to minimize the lee-distance between the selected coefficient and the modified coefficient.

11. A first cryptographic device comprising:
a communication interface circuit, wherein the communication interface circuit is arranged to communicate with a second cryptographic device; and
a processor circuit arranged,
wherein the processor circuit is arranged to obtain a first private key and a first public key,
wherein the first public keys is derived from the first private key, wherein the processor circuit is arranged to transfer the first public key to the second device,
wherein the processor circuit is arranged to receive a second public key and encapsulated data from the second device,
wherein the encapsulated data comprises a data, wherein the processor circuit is arranged to generate a first raw shared key from the second public key and the first private key,
wherein the first public key, the second public key, the first private key and the raw key are one or more polynomials over a ring, and the first public key is obtained from the first private key by a noisy multiplication with one or more shared polynomials, or the first public key, the second public key, the first private key and the first shared raw key are a matrix over a ring, and the first public key is obtained from the first private key by a noisy multiplication with a shared matrix,
wherein the processor circuit is arranged to decapsulate the encapsulated data using the first raw shared key, wherein the decapsulating comprises obtaining a near-code word independent from the first private key, the first public key, and the second public key,
wherein the processor circuit is arranged to apply an error correction function to the near-code word so as to obtain a code word.

12. The first cryptographic device as in claim 11, wherein the processor circuit is arranged to derive the data from the code word.

13. The first cryptographic device as in claim 11,
wherein the second cryptographic device is arranged for a key agreement protocol,
wherein the second device is arranged to derive a shared cryptographic key from at least the data,
wherein the first private key is generated ephemerally,
wherein the first private keys is used to generate the shared key and the first public key,
wherein the first public key is received by the second cryptographic device from the first cryptographic device.

14. The first cryptographic device as in claim 11,
wherein a message is encoded in the code word, or a message is encrypted with a shared symmetric key,
wherein the shared symmetric key is derived from a at least the data, wherein the encrypted message is sent with the second public key from the second device to first device.

15. The first cryptographic device as in claim 11,
wherein a raw shared key is obtained by multiplying a received public key with a private key.

16. The first device as in claim 11,
wherein a reconciliation data is obtained from at least multiple coefficients of the first shared raw key,
wherein the reconciliation data is obtained, sent, received, and/or applied for fewer than all coefficients of the first shared raw key.

17. The first device as in claim 11,
wherein the second raw shared key comprises indicated coefficients,
wherein the reliable bits are at least a portion of the most significant bits of the indicated coefficients,
wherein a reconciliation data for an indicated coefficients are at least a portion of the bits of the indicated coefficients following the reliable bits in significance,
wherein one or more least significant bits of the indicated coefficients may be discarded.

18. The second device as in claim 11,
wherein the processor circuit is arranged to select at least one coefficients in the first shared raw key are indicated by at least a portion of reliable indices,
wherein the processor circuit is arranged to replace the selected coefficients with modified coefficients agreeing with corresponding reconciliation data and minimizing the lee-distance between the selected coefficient and the modified coefficient,
wherein the processor circuit is arranged to obtain reliable bits as one or more most significant bits of the modified coefficients.

19. The second device as in claim 11,
wherein the processor circuit is arranged to select at least a portion of modified coefficients agreeing with the corresponding reconciliation data that would not have been discarded by the first device,
wherein the processor circuit is arranged to minimize the lee-distance between the selected coefficient and the modified coefficient.

20. A cryptographic method for sharing a code word, the method comprising:
communicating with a first cryptographic device;
receiving a first public key, wherein the first public key is associated with the first cryptographic device;
generating a second private key;
generating a second public key from the second private key;
generating a code word according to an error correcting code, wherein the code word is generated independent from the first public key, the second private key, and the second public key;
generating a second raw shared key from the first public key and the second private key,
wherein the first public key, the second public key, the second private key and the second raw shared key are one or more polynomials over a ring, and the second public key is obtained from the second private key by a noisy multiplication with one or more shared polynomials, or the first public key, the second private key and the second raw shared key are a matrix over a ring, and the second public key is obtained from the second private key by a noisy multiplication with a shared matrix,
encapsulating the code word using second raw shared key by applying an encapsulation function to obtain encapsulated data, wherein the encapsulated data comprises a data; and
transferring the second public key and the encapsulated data to the first device.

21. A computer program stored on a non-transitory medium,
wherein the computer program when executed on a processor performs the method as claimed in claim 20.

22. A cryptographic method for sharing a code word, the method comprising:
communicating with a second cryptographic device;
obtaining a first private key;
obtaining a first public key derived from the first private key;
transferring the first public key to the second device;
receiving from the second device a second public key and encapsulated data from the second device;
generating a first raw shared key from the second public key and the first private key,
wherein the first public key, the second public key, the first private key and the first shared raw key are one or more polynomials over a ring, and the first public key is obtained from the first private key by a noisy multiplication with one or more shared polynomials, or the first public key, the second public key, the first private key and the first shared raw key are a matrix over a ring, and the first public key is obtained from the first private key by a noisy multiplication with a shared matrix;
decapsulating the encapsulated data using the first raw shared key;
obtaining a near-code word independent from the first private key, the first public key and the second public key; and
applying an error correction function to the near-code word obtaining a code word.

23. A computer program stored on a non-transitory medium,
  wherein the computer program when executed on a processor performs the method as claimed in claim 22.

* * * * *